United States Patent
Adar et al.

(10) Patent No.: US 9,712,665 B2
(45) Date of Patent: Jul. 18, 2017

(54) APPARATUS, SYSTEM AND METHOD FOR DISPUTE RESOLUTION, REGULATION COMPLIANCE AND QUALITY MANAGEMENT IN FINANCIAL INSTITUTIONS

(75) Inventors: Roy Adar, Kiryat Ono (IL); Shai Shermister, Ra'anana (IL); Motti Nisani, Sedi Hemed (IL)

(73) Assignee: NICE LTD., Ra'Anana (IL)

( * ) Notice: Subject to any disclaimer, the term of this patent is extended or adjusted under 35 U.S.C. 154(b) by 3127 days.

(21) Appl. No.: 10/509,373

(22) PCT Filed: Apr. 9, 2003

(86) PCT No.: PCT/IL03/00300
§ 371 (c)(1),
(2), (4) Date: Oct. 24, 2005

(87) PCT Pub. No.: WO2004/090770
PCT Pub. Date: Oct. 21, 2004

(65) Prior Publication Data
US 2006/0089837 A1    Apr. 27, 2006

(51) Int. Cl.
*G06Q 10/00*        (2012.01)
*H04M 3/22*         (2006.01)
(Continued)

(52) U.S. Cl.
CPC .......... *H04M 3/2227* (2013.01); *G06Q 10/20* (2013.01); *G06Q 20/04* (2013.01);
(Continued)

(58) Field of Classification Search
CPC ...... G06Q 10/20; G06Q 50/182; G06Q 40/04; G06Q 20/04; G06Q 30/018; G07G 3/003;
(Continued)

(56) References Cited

U.S. PATENT DOCUMENTS

| | | |
|---|---|---|
| 4,145,715 A | 3/1979 | Clever |
| 4,527,151 A | 7/1985 | Byrne |

(Continued)

FOREIGN PATENT DOCUMENTS

| | | |
|---|---|---|
| DE | 10358333 | 7/2005 |
| EP | 1 484 892 | 12/2004 |

(Continued)

OTHER PUBLICATIONS

NiceVision—Secure your Vision, a prospect by NICE Systems, Ltd.
(Continued)

*Primary Examiner* — Gerardo Araque, Jr.
(74) *Attorney, Agent, or Firm* — Soroker Agmon Nordman

(57) ABSTRACT

An apparatus, system and method for multimedia capturing, logging and retrieval are disclosed. The apparatus provides time synchronized voice and data interactions capturing and logging, secured playback and retrieval functionality for dispute resolution, for detecting negative and positive conduct, for business analysis and performance, and for quality management. The apparatus provides for synchronization and association of multi-media interactions for financial transactions in order to provide for the retrieval, playback, and review of the transaction-specific events in their temporally correct and integrated sequence.

23 Claims, 9 Drawing Sheets

(51) Int. Cl.
*G06Q 20/04* (2012.01)
*G06Q 30/00* (2012.01)
*G06Q 40/02* (2012.01)
*G06Q 50/18* (2012.01)
*G07F 19/00* (2006.01)
*G07G 3/00* (2006.01)

(52) U.S. Cl.
CPC .......... *G06Q 30/018* (2013.01); *G06Q 40/02* (2013.01); *G06Q 50/182* (2013.01); *G07F 19/207* (2013.01); *G07G 3/003* (2013.01)

(58) Field of Classification Search
CPC .. G07F 19/207; H04M 3/5175; H04M 3/2227
USPC .......................................................... 705/1
See application file for complete search history.

(56) References Cited

U.S. PATENT DOCUMENTS

| | | | |
|---|---|---|---|
| 4,821,118 A | 4/1989 | Lafreniere | |
| 5,051,827 A | 9/1991 | Fairhurst | |
| 5,091,780 A | 2/1992 | Pomerleau | |
| 5,303,045 A | 4/1994 | Richards et al. | |
| 5,307,170 A | 4/1994 | Itsumi et al. | |
| 5,353,618 A | 10/1994 | Crick | |
| 5,404,170 A | 4/1995 | Keating | |
| 5,491,511 A | 2/1996 | Odle | |
| 5,519,446 A | 5/1996 | Lee | |
| 5,734,441 A | 3/1998 | Kondo et al. | |
| 5,742,349 A | 4/1998 | Choi et al. | |
| 5,751,346 A | 5/1998 | Dozier et al. | |
| 5,790,096 A | 8/1998 | Hill, Jr. | |
| 5,796,439 A | 8/1998 | Hewett et al. | |
| 5,847,755 A | 12/1998 | Wixson et al. | |
| 5,895,453 A | 4/1999 | Cook | |
| 5,920,338 A | 7/1999 | Katz | |
| 5,946,375 A * | 8/1999 | Pattison et al. | 379/112.01 |
| 6,014,647 A | 1/2000 | Nizzar et al. | |
| 6,028,626 A | 2/2000 | Aviv | |
| 6,031,573 A | 2/2000 | MacCormack et al. | |
| 6,037,991 A | 3/2000 | Thro et al. | |
| 6,070,142 A | 5/2000 | McDonough et al. | |
| 6,081,606 A | 6/2000 | Hansen et al. | |
| 6,092,197 A | 7/2000 | Coueignoux | |
| 6,094,227 A | 7/2000 | Guimier | |
| 6,097,429 A | 8/2000 | Seeley et al. | |
| 6,111,610 A | 8/2000 | Faroudja | |
| 6,115,693 A * | 9/2000 | McDonough et al. | 705/10 |
| 6,134,530 A | 10/2000 | Bunting et al. | |
| 6,138,139 A | 10/2000 | Beck et al. | |
| 6,167,395 A | 12/2000 | Beck et al. | |
| 6,170,011 B1 | 1/2001 | Beck et al. | |
| 6,212,178 B1 | 4/2001 | Beck et al. | |
| 6,230,197 B1 | 5/2001 | Beck et al. | |
| 6,249,570 B1 * | 6/2001 | Glowny et al. | 379/88.22 |
| 6,252,946 B1 * | 6/2001 | Glowny et al. | 379/88.22 |
| 6,252,947 B1 * | 6/2001 | Diamond et al. | 379/88.22 |
| 6,295,367 B1 | 9/2001 | Crabtree et al. | |
| 6,327,343 B1 | 12/2001 | Epstein et al. | |
| 6,330,025 B1 | 12/2001 | Arazi et al. | |
| 6,345,305 B1 | 2/2002 | Beck et al. | |
| 6,404,857 B1 | 6/2002 | Blair et al. | |
| 6,427,137 B2 * | 7/2002 | Petrushin | 704/273 |
| 6,441,734 B1 | 8/2002 | Gutta et al. | |
| 6,549,613 B1 | 4/2003 | Dikmen | |
| 6,559,769 B2 | 5/2003 | Anthony et al. | |
| 6,570,608 B1 | 5/2003 | Tserng | |
| 6,604,108 B1 | 8/2003 | Nitahara | |
| 6,628,835 B1 | 9/2003 | Brill et al. | |
| 6,704,409 B1 | 3/2004 | Dilip et al. | |
| 7,076,427 B2 | 7/2006 | Scarano et al. | |
| 7,103,806 B1 | 9/2006 | Horvitz | |
| 7,421,660 B2 * | 9/2008 | Charnock et al. | 715/751 |
| 2001/0043685 A1 * | 11/2001 | Bscheider et al. | 379/88.22 |
| 2001/0043697 A1 * | 11/2001 | Cox et al. | 379/265.06 |
| 2001/0052081 A1 | 12/2001 | McKibben et al. | |
| 2002/0005898 A1 | 1/2002 | Kawada et al. | |
| 2002/0010705 A1 * | 1/2002 | Park et al. | 707/104.1 |
| 2002/0022977 A1 * | 2/2002 | Schiff et al. | 705/5 |
| 2002/0059283 A1 * | 5/2002 | Shapiro et al. | 707/100 |
| 2002/0087385 A1 * | 7/2002 | Vincent | 705/10 |
| 2003/0033145 A1 | 2/2003 | Petrushin | |
| 2003/0059016 A1 | 3/2003 | Lieberman et al. | |
| 2003/0078782 A1 * | 4/2003 | Blair | 704/270.1 |
| 2003/0128099 A1 | 7/2003 | Cockerham | |
| 2003/0163360 A1 | 8/2003 | Galvin | |
| 2004/0098295 A1 | 5/2004 | Sarlay et al. | |
| 2004/0141508 A1 | 7/2004 | Schoeneberger et al. | |
| 2004/0161133 A1 | 8/2004 | Elazar et al. | |
| 2004/0249650 A1 * | 12/2004 | Freedman et al. | 705/1 |
| 2006/0093135 A1 | 5/2006 | Fiatal et al. | |

FOREIGN PATENT DOCUMENTS

| | | | |
|---|---|---|---|
| GB | 9916430.3 | 7/1999 | |
| WO | WO 95 29470 A | 11/1995 | |
| WO | WO 98 01838 A | 1/1998 | |
| WO | WO 00/73996 A1 | 12/2000 | |
| WO | WO 02/037856 | 10/2002 | |
| WO | WO 03/009175 A1 * | 1/2003 | G06F 17/30 |
| WO | WO 03 013113 A2 | 2/2003 | |
| WO | WO 03 067360 A2 | 8/2003 | |
| WO | WO 03 067884 A1 | 8/2003 | |
| WO | WO 2004 091250 | 10/2004 | |

OTHER PUBLICATIONS

NICE Systems announces New Aviation Security Initiative, reprinted from Security Technology & Design.
(Hebrew) "The Camera That Never Sleeps" from Yediot Aharonot.
Freedman, I. Closing the Contact Center Quality Loop with Customer Experience Management, Customer Interaction Solutions, vol. 19, No. 9, Mar. 2001.
PR Newswire, NICE Redefines Customer Interactions with Launch of Customer Experience Management, Jun. 13, 2000.
PR Newswire, Recognition Systems and Hyperion to Provide Closed Loop CRM Analytic Applications, Nov. 17, 1999.
Financial companies want to turn regulatory burden into competitive advantage, Feb. 24, 2003, printed from InformationWeek, http://www.informationweek.com/story/IWK20030223S0002.
SEDOR—Internet pages form http://www.dallmeier-electronic.com.
(Hebrew) print from Haaretz, "The Computer at the Other End of the Line", Feb. 17, 2002.
Article Sertainty—Automated Quality Monitoring—SER Solutions, Inc.—21680 Ridgetop Circle Dulles, VA—www.ser.com.
Article Sertainty—Agent Performance Optimization—2005 SE Solutions, Inc.
Lawrence P. Mark SER—White Paper—Sertainty Quality Assurance—2003-2005 SER Solutions Inc.
Douglas A. Reynolds Robust Text Independent Speaker Identification Using Gaussian Mixture Speaker Models—IEEE Transactions on Speech and Audio Processing, vol. 3, No. 1, Jan. 1995.
Chaudhari, Navratil, Ramaswamy, and Maes Very Large Population Text-Independent Speaker Identification Using Transformation Enhanced Multi-Grained Models—Upendra V. Chaudhari, Jiri Navratil, Ganesh N. Ramaswamy, and Stephane H. Maes—IBM T.j. Watson Research Centre—Oct. 2000.
Douglas A. Reynolds, Thomas F. Quatieri, Robert B. Dunn Speaker Verification Using Adapted Gaussian Mixture Models—Oct. 1, 2000.
Yaniv Zigel and Moshe Wasserblat—How to deal with multiple-targets in speaker identification systems?
A tutorial on text-independent speaker verification—Frederic Bimbot, Jean Bonastre, Corinn Fredouille, Guillaume Gravis, Ivan Chagnolleau, Sylvian Meigner, Teva Merlin, Javier Ortega Garcia, Dijana Deacretaz, Douglas Reynolds—Aug. 8, 2003.

(56) References Cited

OTHER PUBLICATIONS

Yeshwant K. Muthusamy et al—Reviewing Automatic Language Identification IEEE Signal Processing Magazine 33-41.
Marc A. Zissman—Comparison of Four Approaches to Automatic Language Identification of Telephone Speech IEEE Transactions on Speech and Audio Processing, vol. 4, 31-44.
Towards and Automatic Classification Of Emotions In Speech—N. Amir. S. Ron.

* cited by examiner

APPARATUS, SYSTEM AND METHOD FOR DISPUTE RESOLUTION, REGULATION COMPLIANCE AND QUALITY MANAGEMENT IN FINANCIAL INSTITUTIONS

RELATED APPLICATIONS

The present invention relates to PCT patent application number PCT/IL02/00539 for METHOD, APPARATUS AND SYSTEM FOR CAPTURING AND ANALYZING INERACTION BASED CONTENT, filed 18 Jul. 2002, to PCT patent application number PCT/IL01/00796 for SYSTEM AND METHOD FOR CAPTURING BROWSER SESSIONS AND USER ACTION, filed 24 Aug. 2001, to PCT patent application number PCT/IL02/01042 for SYSTEM AND METHOD FOR VIDEO CONTENT ANALYSIS-BASED DETECTION, SURVEILLANCE, AND ALARM MANAGEMENT, filed 24 Dec. 2002, to PCT patent application number PCT/IL02/00741 for RECORDING AND QUALITY MANAGEMENT SOLUTIONS FOR WALK-IN ENVIRONMENTS, filed 5 Sep. 2002, and to PCT patent application number PCT/IL03/00097 titled METHOD AND APPARATUS FOR VIDEO FRAME SEQUENCE-BASED OBJECT TRACKING filed 6 Feb. 2003, the content of which is hereby incorporated by reference.

BACKGROUND OF THE INVENTION

Field of the Invention

The present invention generally relates to multimedia recording and retrieval. More specifically, the present invention relates to a method, an apparatus and a system for quality management, regulation compliance, and business intelligence in financial institutions, in particular.

Discussion of the Related Art

Financial institutes are operate under strict laws, rules and regulations designed to protect both the financial institutes and investors from fraudulent financial activities, such as money laundering, terror funding, theft, misconduct and other similar wrongdoing.

The regulations require that financial institutes keep the records of the various interactions carried out between various personnel for a pre-specified period of time for the purposes of regulation compliance and for the resolution of dispute situations. A dispute is typically resolved by the re-construction of the transaction-specific interactions among the parties. Such re-construction is typically accomplished by obtaining one or more recordings representing the transaction-specific interactions, and by re-playing recordings.

The completion of certain financial transactions may involve the performance of multiple interactions between the participating parties. A multiple interaction refers to the performance of more than one interaction during the same transaction. Multiple interactions may be of the same interaction type or could include different interaction types. One example, of a multiple interaction type is a conversation between two parties that involves capturing of voice over IP and instant messaging between the same parties, the interaction resulting in a transaction.

Presently available recording systems have several disadvantages. The major drawback of existing systems concern the complete and total separation of the various recording sub-systems and the resulting complete lack of automatic connectivity options there between. Each interaction type associated with a specific communication channel is handled separately by a specific recording sub-system. Presently, there is no connectivity and users must search manually through the various archives of the separate sub-systems and attempt manually to associate interaction records to a relevant transaction. When a dispute situation arises there is a need to locate, to obtain, to connect and to integrate the entire set of interaction types captured during the performance of the transaction.

A second drawback of the existing systems and methods relate to the security of the information as presently no mechanisms exists to prevent unauthorized persons to gain access to the information.

A further drawback of the currently operating systems concern the lack of time synchronization option among the separate sub-systems and therefore the lack of time synchronization between the interactions recorded therein. The temporal order of the interactions is particularly important in the processing of a transaction and the time synchronization of the interactions associated with a specific transaction is essential to the resolving of a dispute situation. Existing systems do not provide for multimedia interaction handling in such a manner that all interactions are synchronized and played back in the correct sequence of the events Financial institutes attempting to comply with the regulations face additional problems. One problem regards the fact that the majority of the initial interactions in a trading floor do not necessarily lead up to an actual financial transaction. It is an additional drawback of the currently existing recording systems that presently no differential identification can be made between informal calls and calls that lead up to a transaction.

Presently, each financial transaction stored in the bank's dealing systems is assigned a unique identifier in a manual manner. In many cases the terms of the transaction are specified during the interactions, but the actual entering of the transaction into the bank's dealing systems is usually made only after the interaction is terminated. As a result the identifier assigned to the transaction in the bank's system has not yet existed at that point in time where the interaction was performed. The lack of connectivity and association between the transactions recorded in the bank's dealing systems and the interactions through which the transaction was originated often forces, internal auditors to examine large volumes recorded interactions manually until a suitable call is located. By allowing accurate location of the interaction records related to each transaction, the same auditing teams using the same resources could be more efficient and audit more transactions.

In addition, financial institution archives storing recorded customer-specific interactions contain a plurality of confidential information. Today, although financial institutes make substantial efforts to limit access to these archives there is often an urgent need to locate customer-specific interactions. Existing systems do not provide an automated solution for playback request handling while maintaining secrecy, privacy and controlled access to interactions. Financial institutions are also required to operate in accordance with specifically pre-defined rules of conduct. Supervisors must examine the interactions in order to make sure that the rules of conduct are implemented. Currently no efficient method exists to detect cases where the rules of conduct are not followed except through manual handling of a vast amount of phone calls or recordings.

The rules of conduct recommend that details of all telephone deals should be confirmed by fax or by similar means however there is no efficient method presently to detect the presence or the lack of the suitable confirmation procedures other than unstructured manual access to the archives and listening to vast amount of calls or recordings.

Day trading for personal accounts is one example of a situation that requires full disclosure and transparency in order to ensure that traders give undivided attention to their institution's business, without being distracted by personal conflict of interests. There is no method currently to detect such cases other than unstructured manual access to the archives and listening to vast amount of calls or recordings.

It would be readily perceived by one with ordinary skills in the art that the current systems do not provide efficient solutions for financial institutions. Therefore, there is need for a novel integrated multimedia capturing and logging system for financial institutions. Such a system should preferably handle all the applicable media type interactions and should retain the various media type interactions in an integrative, synchronized and associated manner. The captured and logged elements would preferably comprise precisely timed and synchronized sequences of events in order to assist in the proper resolution of dispute situations, in dispute settlement and in the general identification of misconduct. The system would preferably include advanced tools, such as audio and data content analysis for the processing of the recorded interactions for the purposes of regulation compliance, dispute resolution, and advanced content analysis.

SUMMARY OF THE PRESENT INVENTION

One aspect of the present invention regards an apparatus for the synchronization, integration and association of financially related captured interactions, the apparatus comprising a first interaction capturing device for capturing an interaction, a second interaction capturing device for capturing a second interaction, a synchronizing device to synchronize the first interaction with the second interaction and an integration device to integrate the first interaction with the second interaction into an integrated interaction. The apparatus further includes an association device to associate the integrated interaction with the transaction. The apparatus further includes a recording and logging device for storing the at least first interaction, the at least one second interaction. The apparatus further includes an interaction retrieval device to retrieve the at least one first interaction, the at least one second interaction, and the integrated interaction. The apparatus further includes an interaction playback device to playback the at least one first interaction, the at least one second interaction and the integrated interaction. The apparatus further include a set-up and calibration device to set up the parameters of the apparatus and to adaptively calibrate the parameters of the apparatus. According to the invention the apparatus further including a secure access device to provide for secure, controlled and limited access to the at least one first interaction, to the at least one second interaction and to the integrated interaction. The secure access device further provides a secure time-based access. The apparatus further include a database for storing the at least one first interaction. The apparatus further includes a database for storing the at least one second interaction. The apparatus further includes a database for storing the at least one first and second interaction. The apparatus further including a database for storing meta-data to provide the ability to retrieve the integrated interaction. The apparatus further includes a content analysis module to analyze the content of the at least one first interaction, the content of the at least one second interaction and the content of the integrated interaction. The apparatus further including at least one knowledge database for storing information associated with the at least one first interaction or with the at least one second interaction or with the integrated interaction. According to the invention the apparatus further including a notification message-generating device for generating a notification message associated with the at least one first interaction or with the at least one second interaction or with the integrated interaction. The apparatus further including a notification message-generating device for generating a notification message associated with misconduct. The apparatus further including a notification message-generating device for generating a notification message associated with dispute resolution. The apparatus further including a notification message-generating device for generating a notification message associated with a request for playback. The apparatus further including a business analysis device to collect and analyze business performance and information. According to the invention the apparatus further includes a monitoring device to monitor the content of the at least one first interaction or the at least one second interaction. The apparatus further including an evaluations device to evaluate the performance or level of service of a representative. The apparatus further comprising a surveillance device to detect and monitor a behavior pattern of a representative. The surveillance device provides notification regarding the detection of or changes in behavior patterns. The at least one first interaction and at least one second interaction are associated with transaction. The secure access to the at least one first interaction, the at least one second interaction and the integrated interaction is based on password-protected permission granting process. The secure access is a password based access. The secure access is a password and time based access. The at least one first interaction, the at least one second interaction and the integrated interaction represent an interaction between at least two parties. The monitoring device, the surveillance device and the content analysis device provide information in real or off line. The apparatus further including an automatic scheduler device for the automatic selection of interactions to be monitored, analyzed and evaluated. The at least one first interaction or the at least one second interaction is an audio or video interaction. The at least one first interaction or the at least one second interaction is a data exchange or data capture interaction.

A second aspect of the present invention regards to a method for the synchronization, integration and association of financially related captured interactions, the method comprising the steps of capturing an at least one first interaction at a first interaction capturing device, capturing an at least one second interaction at a second interaction capturing device, synchronizing the at least one first interaction with the at least one second interaction and integrating the at least one first interaction and the at least one second interaction into one integrated interaction. The method further comprises the step of associating the integrated interaction with transaction. The method further comprises the step of recording and logging the at least one first interaction and the at least one second interaction on recording and logging device. According to the invention the method further comprises the step of retrieving the at least one first interaction, the at least one second interaction. The method further comprises the step of generating the integrated interaction from the retrieved at least one and second interaction. The method further comprises the step of playing back the at least one first interaction, the at least one second interaction, or the integrated interaction. The method further comprises the step of setting up the operating parameters of the method and adaptively calibrating the operative parameters. According to the invention the method further comprises the step of analyzing the contents of the at least one first interaction, the content of the at least one second interaction and the content of an integrated interaction. The method further comprises the step of generating a notification message concerning misconduct in association with the at least one first interaction, with the at least one second interaction, or the integrated interaction. The method further comprises the step of collecting additional information. According to the invention the method further comprises the step of analyzing the collected additional information. The step of analyzing the transaction and the associated integrated interaction further provides thereby analyzing the interaction associated with a dispute. The step of analyzing further provides for regulatory compliance. The step of analyzing further provides for quality management. The method further comprises the step of monitoring in real-time the content of the at least one first interaction, the at least one second interaction, and the integrated interaction. The step of monitoring further provides for the detection of malpractice. The method further comprises the step of automatically scheduling and automatic selection of the integrated interaction to be monitored, analyzed and evaluated. The synchronizing of the at least one first interaction with the at least one second interaction is a time-based synchronizing process or is a sequential-based synchronizing process. The at least one first interaction and the at least one second interaction are identified by an interaction identifier. The interaction identifier is a unique point-in-time based identifier. The interaction identifier is a unique identifier. The at least one first interaction and the at least one second interaction constitute a time-based sequence of events.

BRIEF DESCRIPTION OF THE DRAWINGS

The present invention will be understood and appreciated more fully from the following detailed description taken in conjunction with the drawings in which.

DETAILED DESCRIPTION OF THE PREFERRED EMBODIMENT

Figure 1:
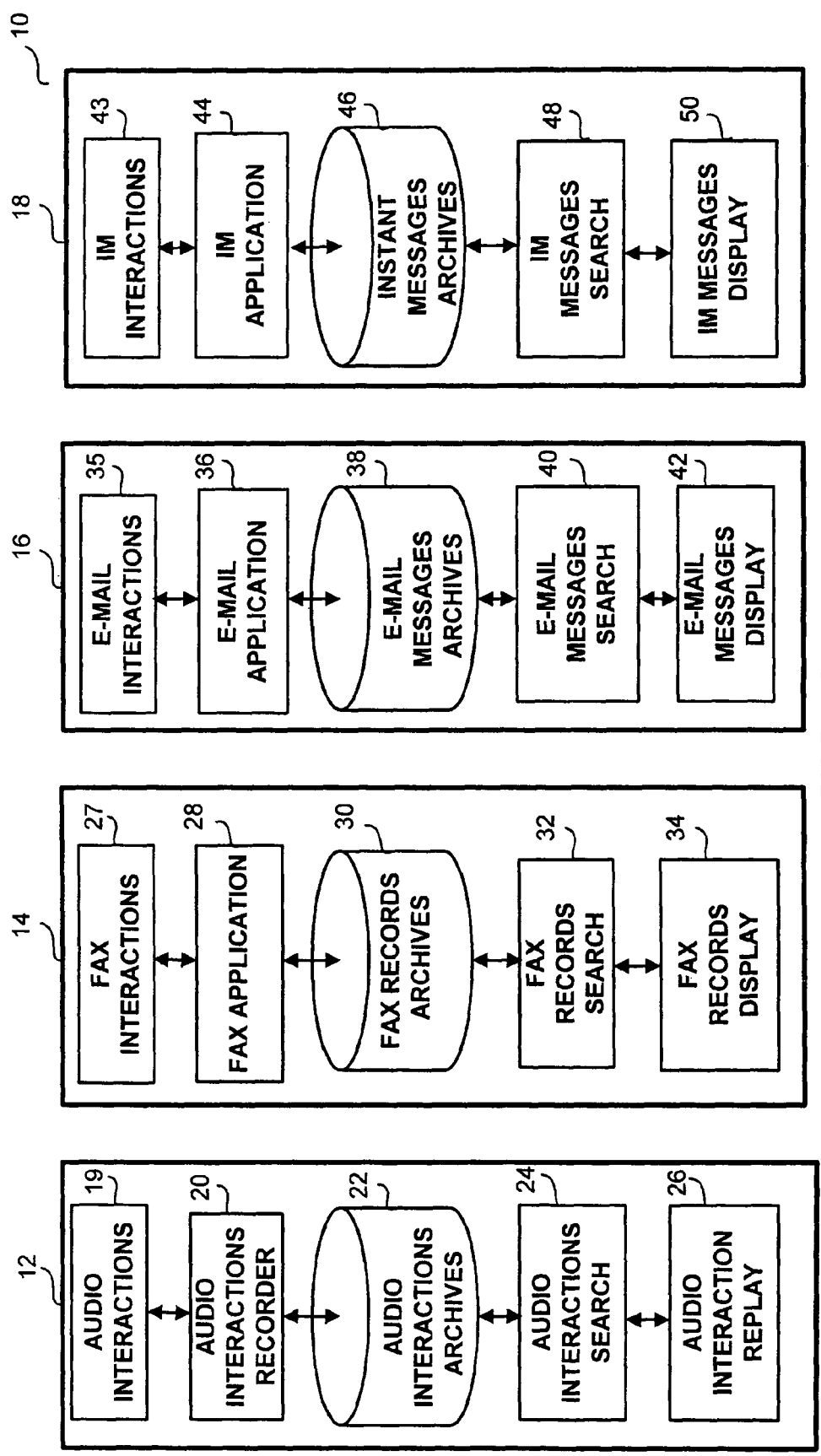
FIG. 1 is a schematic illustration of a multiple multimedia interaction recording and logging system, as known in the art.

An apparatus, system and method for the recording and integrated archiving of multi-channel, multi-media and rich media interactions in financial institutions are disclosed. The proposed apparatus, system and method associates the interactions in a synchronized and integrative manner with the relevant business transactions in order to provide for integrative search, secured retrieval, ready playback and efficient review of the interactions and the proper time-sequenced re-construction of an associated transaction process. In addition, the proposed apparatus, system, and method are provided with built-in capabilities that enable the generation of business analysis and performance information. The system further includes specific, advanced tools for detecting suspicious behavioral patterns of users of the system, such as traders and supervisors. The proposed apparatus, system, and method further provide quality management application to promote quality of service in financial institutions. Despite the diversity of needs and dissimilarities concerning the specific regulations to be enforced in different countries, the system is designed such as to cover all the essential needs while maintaining scalabilities in order to meet the dynamic changes that characterize the global financial market.

The proposed system provides automatic scheduling and surveillance using real time content analysis, off-line analysis and key words spotting indicating either after work hour activity or "excessive friendliness" expressions indicating giving or promising gifts or benefits made by the customer, or direct use of words such as "presents", "gifts", "party", and the like. [

The above features could alert the management or could record it for future surveillance monitoring the frequency of gifts received or provided. The proposed apparatus, system, and method are operative in the integration of the content analysis framework with Computer Telephony Integration (CTI) and the Customer Relationship Management (CRM) systems in order to provide for a tracking capability. The tracking is accomplished via the utilization of business analysis and detection attempts regarding the beneficiary. Suitable options for the notification of the management are disclosed as well.

The proposed apparatus, system and method provide the capability of capturing the screen activity of the employees' of the financial institution in order to verify and validate the behavior of the employee along the sequence of the transaction execution. It will be evident that the present invention relates to interactions rather than to complete transactions. It may be the case that any interaction is made for the purpose of inquiry or for receiving information for future potential transactions and the like. Irrespective of such interactions the present invention is also directed towards interactions resulting in transactions. Any indications of irregularity will trigger malpractice alerts to be communicated to the management. It utilizes diverse database sources, such as the organization knowledge base that contains access to customer's transactional information, additional customer's personal information such as social security number, personal address, CTI information, such as source of call, caller ID, Automatic Number Identification (ANI), Dialed Number Identification Service (DNIS), and the like, and the content analysis data base of results, such as words spotted, accents detected, speaker verification results, and the like. The information is processed in order to detect unfamiliar customers and to trigger further investigation by the management.

Content analysis tools are used in the context of the present invention and inherently supports multi-media inputs, correlation between the interaction of parties recorded and text extraction from the acknowledged information captured, confirming transaction details, such as price. Content analysis of both synchronized video and audio is performed to detect breaches of confidentiality occurring off-premises or outdoors. Video content analysis was described in detail in the referenced co-pending PCT applications: patent application serial number PCT/IL03/00097 titled METHOD AND APPARATUS FOR VIDEO FRAME SEQUENCE-BASED OBJECT TRACKING filed 6 Feb. 2003 and walk-in centers face to face recording of video and audio was described in detail in the referenced co-pending PCT patent application serial number PCT/IL02/00741 titled RECORDING AND QULAITY MANAGEMENT FOR WALK-IN ENVIRONMENTS filed 5 Sep. 2002 and content analysis on video and audio described in detail in US patent application serial No. 2002/0110264B 1 titled VIDEO AND AUDIO CONTENT ANALYSIS SYSTEM filed 15 Aug. 2002.

In addition, the proposed apparatus, system and method provides the option of investigating employees' interactive screen activity to detect the source of specious information via the capturing of web-co browsing activities, URL selections, and the like, gathering information on practice pattern, alongside with the voice captured content analysis spotted words in helping to mold the employees' particular practices patterns. The most straightforward solution utilized for the detection of specious information involved is the detection of specific pre-determined phrases like "I heard", "rumor has it", and the like. Inter-institutional issues can be resolved using the inherent capability of captured interaction playback alongside with the screen event activities generated. The usage of content analysis can further generate cross processing of results to assist rapid dispute resolution. A plurality of business information is collected by the system of the present invention and is utilized through employing content analysis methods; such as speech analysis alongside with word or sentence spotting that is correlated with the employees' screen activity in order to detect irregularities and in order to alert the management to possible malpractices. Note should be taken that personal account monitoring is a delicate task since the employees' state of mind and private concerns are potentially involved. Speech analysis is utilized to detect certain voice characteristics, such as stress, cross talk, stuttering, tone vibration, and the like. Speech analysis is further operative in word or sentence spotting. The results of the analysis in conjunction with the captured records generated by the employees' screen activity could indicate irregularity in order to trigger alerts to the management in regard to a potential malpractice.

Referring now to FIG. 1 showing a typical multi sub-systems interaction recording and logging system 10 used by financial institutions. The system 10 comprises several sub-systems where each sub-system is associated with a specific interaction type based on a specific communication method. Each sub-system is designed to implement an interaction of a specific type, to record and to store the record of the interaction and to provide suitable tools for the subsequent processing of the interaction records, such as interaction location, display, review, and the like. The system 10 includes an audio interaction recording sub-system 12, a fax interaction recording sub-system 14, an electronic mail (e-mail) interaction recording sub-system 16, and an instant messaging (IM) interaction-recording sub-system 18. The audio interaction sub-system 12 includes audio interactions 19, an audio interactions recorder device 20, audio interactions archives 22, an audio interactions search component 24 and an audio interaction replay component 26. The fax interaction sub-system 14 includes fax interactions 27, a fax application 28, fax records archives 30, a fax records search component 32 and a fax records display component 34. The e-mail interaction sub-system 16 includes e-mail interactions 35, an e-mail application 36, e-mail messages archives 40, an e-mail messages search component 40 and an e-mail messages display component 42. The IM interaction sub-system 18 includes IM interactions 43, an IM application 44, IM messages archives 46, an IM messages search component 48 and an IM messages display component 50. It would be readily perceived that each of the recording sub-systems 12, 14, 16, 18 operate separately and independently in respect to each other. The separate sub-systems 12, 14, 16, 18 are utilized for the implementation of financial transaction-specific interactions between two or more participants. The sub-systems 12, 14, 16, 18 are based on the utilization of specific communication channels via which the interactions are performed. Thus, the audio interactions sub-system 12 could utilize a voice communication channel constituting phone devices, telephone lines, line interface devices, telephone exchanges, and the like. The audio interactions recorder device 20 typically records the audio interactions 19. The audio records representing the content of the voice interactions are stored in the audio interactions archives 22. The archives 22 are accessible via the audio interactions search method 24. The search 24 typically provides the option of simple manual searches. The manual search could be conducted through a Call Management System server that has all the parameters of the calls. A person submits queries that include specific search parameters, such as for example, calls performed on a specific data from specific telephone number to a Call Management System. The Call Management responds by providing the option of playback for all or a part of those calls that comply with the search parameters. The manual search could be further performed through the interaction logger that includes a database storing the previously performed calls. Subsequent to the location of the records by the search method 24 the records are replayed by the audio interaction replay routine 26 to provide for interaction review, transaction process review and transaction process re-construction. In some cases a transaction may comprise a single interaction type such as a single phone call resulting in a transaction. Incomplete transactions or other single interaction types may be analyzed by the present system. In one example, a call made to obtain information may be analyzed by the present invention.

Still referring to FIG. 1 similarly the fax interactions sub-system 14, the e-mail interactions sub-system 16, and the IM interactions sub-system 18 utilize fax communication channels, e-mail communications channels, and IM messaging communications channels, respectively. The fax messages are handled by the fax application 28. Copies of the completed fax interactions 27 could be archived either manually or automatically into the fax records archives 30. The fax records search method 32 provides the option of locating specific fax interactions records stored in the archives 30. Locating such faxes can be performed according to simple parameters relating to the fax messages and recorded such as the fax sender or receiver, but not the content of the fax. Subsequent to the location of a specific fax interaction record in the archives 32 the record could be displayed by the fax records display component 34 for the purposes of transaction process review and transaction process re-construction.

Still referring to FIG. 1, e-mail interactions 35 typically comprise incoming and outgoing e-mail messages transmitted typically through a data communication network. The e-mail messages are handled by the e-mail application 36. Records reflecting the completed e-mail interactions 35 are typically archived into the e-mail messages archives 38. The search is typically performed by sequential browsing through the archives via the utilization of suitable software controls connected to the computer-based storage device. Such search is based on fields in the particular e-mails messages captured. Subsequent to the location of a specific e-mail message record in the archives 40 the record could be displayed by the e-mail messages display routine 42 for the purposes of interaction review, transaction process review and transaction process re-construction.

Still referring to FIG. 1 1M interactions 43 typically comprise IM messages transmitted typically through a data communication network. The IM messages are handled by the IM application 44. Records reflecting the completed IM interactions 43 are typically archived into the IM messages archives 46. The IM messages search routine 48 provides the option of locating specific IM messaging records stored in the archives 46. The search is typically performed by sequential browsing through the archives via the utilization of suitable software controls connected to the computer-based storage device. Such search is based on fields in the particular IM messages captured. Subsequent to the location of a specific IM message record in the archives 46 the record could be displayed by the IM messaging display routine 50 for the purposes of interaction review, transaction process review and transaction process re-construction.

Figure 2:
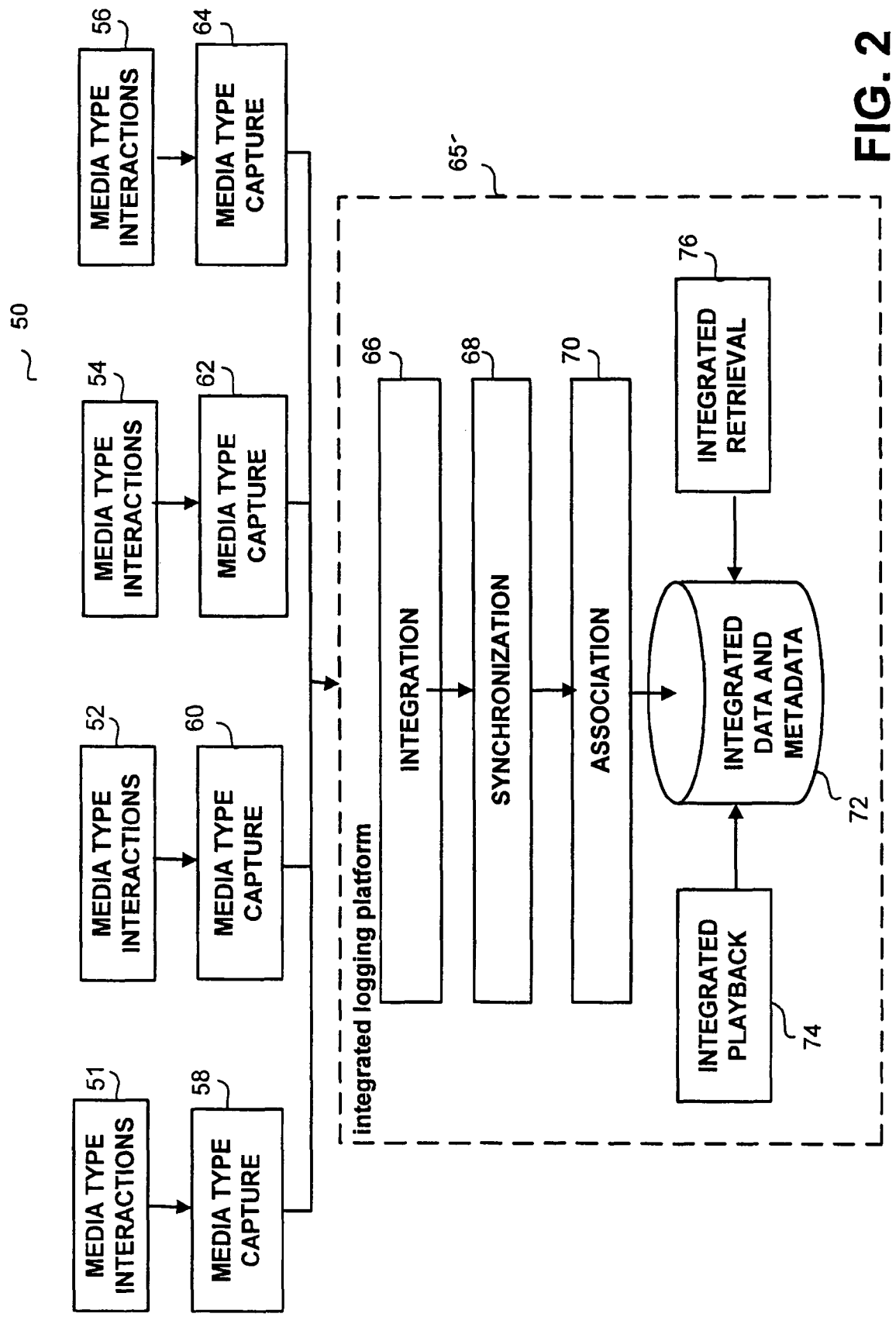
FIG. 2 is a schematic illustration of a multiple multimedia interaction recording and logging system, in accordance with a preferred embodiment of the present invention.

Referring now to FIG. 2 showing a schematic illustration of a multiple multimedia interaction recording and logging system, in accordance with a preferred embodiment of the present invention. The recording and integrative logging system 50 includes media type interactions 51, 52, 54, 56, media type capture units 58, 60, 62, 64, and an integrated logging platform 65. Media type interactions 51, 52, 54, 56 refer to diverse separate communication interfaces associated with diverse separate communication channels that provide interaction capabilities among the participants, such as, for example, a customer and a trader, for the initiation, progressive realization and final completion of a financial transaction between a customer and a financial institution or between two or more financial institutions. The media type interactions 51, 52, 54, 56 involve exchanges of transaction-specific information, the introduction and submittal or trans-action-specific instructions or orders, order-specific confirmations, corrections to previous orders, negotiations, and the like. The media type interactions 51, 52, 54, 56 could involve an audio or video interaction, such as direct face-to-face voice conversation or a phone call, electronic exchange of financial transaction-specific data, such as e-mail messaging, instant messaging, fax messaging, captured video showing the persons conversing or exchanging information, and the like. Various other types of media type interactions could be used, including analog and digital multi-media and rich-media interactions. The different interactions 51, 52, 54, 56 are performed in accordance to the configuration and pre-defined operating options associated with specific hardware and software interfaces. Thus, an audio interaction could be performed via a Computer Telephony Integration (CTI) mechanism in association with audio communication devices, such as phone devices, communication lines and various suitable software modules. Similarly, a fax interaction is based on conventional fax machines, and conventional communication lines. An e-mail interaction could be performed by appropriate software routines constituting an e-mail application installed in a personal computer, where the submitted messages are transmitted between the participants via a data communication network, such as the Internet. Each interaction may be recorded by a video camera, via analog or digital recording device. The recorded file or analog recording is associated with the interaction recorded and transaction being performed. The media type capture units 58, 60, 62, 64 are linked to the media type interaction specific interfaces. The capture units 58, 60, 62, 64 are operative in the recording of the content of the media type interactions where the manner of the recording is in accordance with the interaction interface. Thus, and audio interaction generates audio records, a fax interaction, for example, generates text-based fax records, an e-mail interaction generates rich-text based e-mail message, a video interaction generates video frames, and the like. The media type capture devices may include a telephone, a fax, an e-mail server, an analog or digital video camera, an analog or digital audio microphone and other devices capable of capturing interactions between the parties to a transaction. Analog captured information is preferably converted into digital form to enable streamlining of the information handled by the system of the present invention, though non-transformed analog captured media may also be managed through the use of records related and pointing to the analog media serving as the connectors to the analog media.

Figure 3:
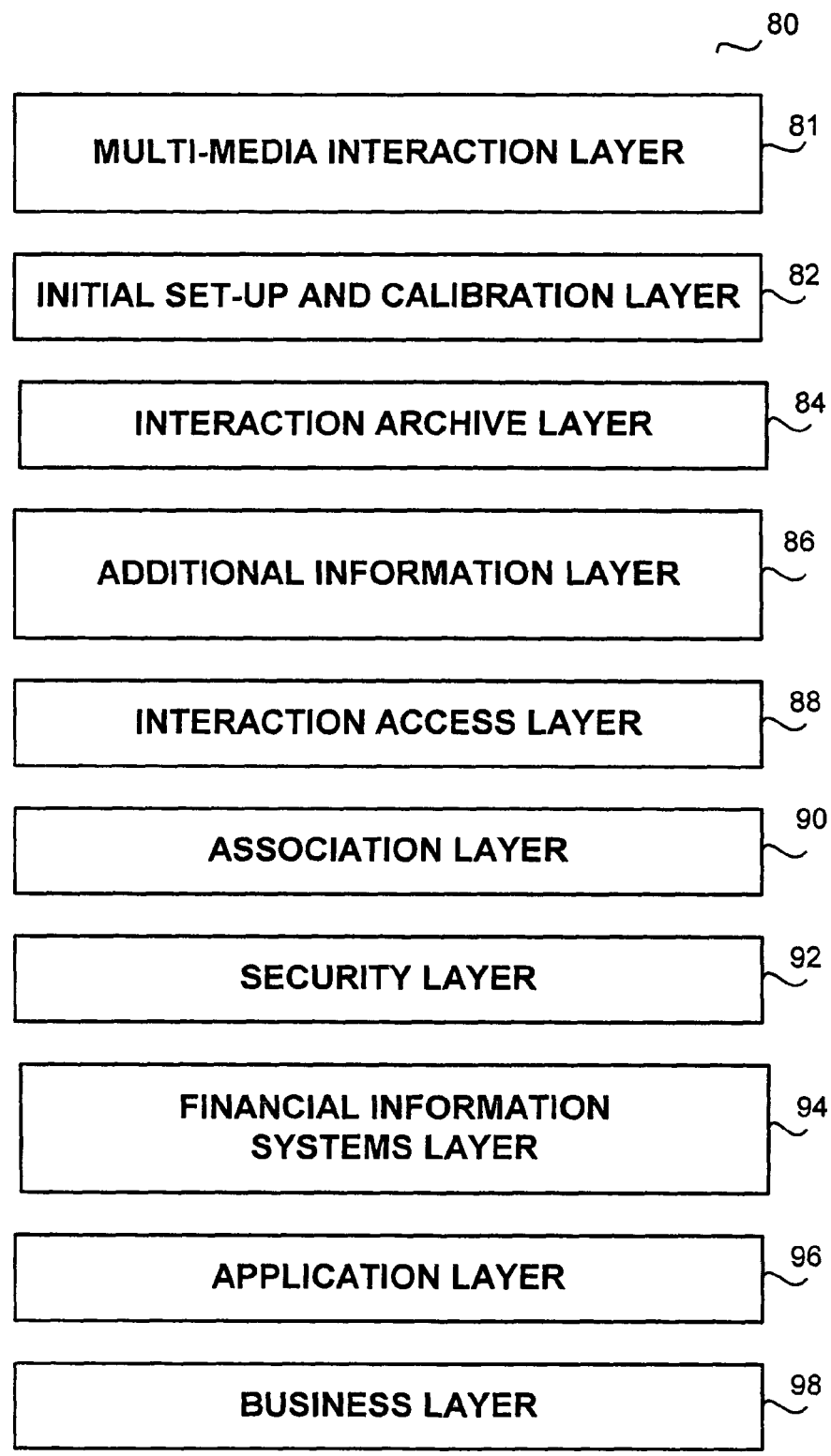
FIG. 3 is depicts the operative layers of the multiple multimedia interaction recording and logging system, in accordance with a preferred embodiment of the present invention.

Still referring to FIG. 2 the separately performed and captured media type interaction content records are transferred to the integrated logging platform 65. The platform 65 is typically a computing device with multi-media processing and storage capabilities. The platform 65 further provides specific record data retrieval and playback features. The platform 65 receives the separately generated and captured interaction records and processes the records in order to provide for interaction integration 66, for time synchronization 68 and for the association 70 of the interaction records to a relevant financial transaction or transactions. The integrated, time-synchronized and transaction-associated interaction records are stored in an integrated database 72 as multi-media data records, encoded into machine-readable format where each type of record is structured in accordance with type of the media represented by the record. Thus, the database 72 could include audio records, text records, video records, scanned records, data records, and the like. The database 72 further includes pre-defined metadata information concerning the media type of the potential records, the location, structure and organization of the records, the indexing schemas, and the like. The database 72 could include raw data records representing the interactions or pointer records that indicate storage location of the interaction records. The integrated collection of the multi-media records provide the option for the integrated retrieval 76 of one or more interaction record and for the integrated playback 74 of one or more interaction record for purposes of interaction review, and transaction process re-construction. Thus, the integrated retrieval 76 and the associated integrated playback 74 provide for enhanced regulation compliance, rapid dispute resolution, improved quality management, more efficient methods for the detection of suspicious behavior patterns, business patterns analysis, and the like. The features of the integrated logging platform 65 provide for substantially improved records retrieval, playback, and review methods in respect of the currently offered systems. Note should be taken than on the drawing under discussion a limited number of media type interactions and a limited type of associated media type capture units are shown. Furthermore, on the drawing under discussion only a single integrated logging platform is shown. It would be readily perceived that in a realistic environment a plurality of media type interactions could generate interaction records, which could be captured by a plurality of media type capturing units. In practice, the plurality of the interaction records could be transmitted and stored on more than one integrated logging platforms in accordance with a predefined system configuration. Note should be taken that the transactions generated following the performance of the interactions could be completed interactions or non-completed transactions. Referring now to FIG. 3 that depicts the operative layers of the multiple multimedia interaction recording and logging system, in accordance with a preferred embodiment of the present invention. The multi-channel multimedia capturing, logging and retrieval apparatus and system 80 provides time-synchronized voice and data interactions capturing, logging and secure playback and retrieval capabilities for quality management, for dispute resolution, for positive and negative conduct detection, and for business analysis, and financial institutions. The apparatus 80 is build from layers, and components, devices and methods embedded in specific routines, where each layer, component, device and imbedded method can be implemented either as described in association with the drawing or can be implemented as part of a different layer. The layers, components, devices and methods embedded in specific routines can be deployed on a single platform, could be distributed locally across a Local Area Network (LAN), could be distributed remotely across a Wide Area Network (WAN), or the like. The supporting networks could be IP networks, wireless networks, satellite networks, radio networks, cellular networks, CATV distribution networks, and the like. For example the media type capture units 58, 60, 62, 64 of FIG. 2 could be located in the front office desks in a New York branch of a financial institution while the integrated logging platform 65 of FIG. 2 could be deployed in the back office site located in Washington D.C. where the remote devices communicate via a Wide Area Network (WAN). The system 80 includes a multi-media interaction layer 81, an initial set-up and calibration layer 82, an interaction archives layer 84, an additional information layer 86, an interaction access layer 88, an association layer 90, a security layer 92, a financial information systems layer 94, an application layer 96, and a business layer 98. The multi-media interaction layer 81 includes the various interaction types that commonly present in typical financial institutions, such as instant messaging, e-mail, chats, web co-browsing, phone calls, screen sequence evens, video, audio, survey results, and the like. Such interactions take place between two or more participants that are parties in the initiation, progressive negotiation, and completion of a financial transaction. The participants could include diverse employees or representatives of one or more financial institutions as well as private customers. The employees typically include traders, brokers, back office representatives, sales representatives, other financial institutes, trading floor representatives, and the like. The customers typically include private customers, institutional customers, and the like. The functionality of the layer 81 is to provide interaction-specific multi-media records where the content of the records reflect the substance of the associated interactions. The initial set-up and calibration layer 82 is responsible for the configuration of the system and for the setting up of the system, in accordance with the multi media interactions types found on the particular financial institute site. The configuration/setup/calibration could be accomplished on site in order to make sure that the functionality of the system corresponds with the requirements of the customer and the environment. During the lifetime of the system, calibration can be performed adaptively in accordance with the institution's profile and accumulated changes. The interaction archives layer 84 provides for the archiving of the interaction records and includes the various relevant databases. The additional information layer 86 are being used with the interaction archives information for the purpose of gathering real-time information on the content of the information in order to monitor the compliance with institutional regulations, pre-defined code of conduct and other local organization rules, State and Federal or industry wide rules with respect to the interactions. The interaction access layer 88 locates and retrieves interaction records from the interactions archives while using metadata information and the additional sources of information capture layer 86. The association layer 90 is designed to associate the transaction in the financial institute's transaction system with the previous interactions that led up to the transaction kept in the interaction archiving layer 84. The security layer 92 is responsible for complying with the code of conduct of financial institutes, which demands that access for playback and retrieval of interactions from the interaction archives will be managed in a controllable and restricted manner. The financial information systems layer 94 is the central system in the organization. The financial information system 94 comprises an existing transactional system of the organization. The system 94 is used for the entering and storage of transactional information, such as closing tickets, trade information, completed transactions information, and the like. The system 94 could be a CRM system. Presently, such a system operates typically independently of the logging devices. $_{13}$The system 94 is utilized as the main access point for the trader. In accordance with the preferred embodiments of the present invention, the system 94 uses integrated components in order to provide the ability to perform the unique functions provided by the proposed system and method. The proposed system and method operates preferably through the system 94 or operates in conjunction with the system 94 . . . The application layer 96 provides diverse applications with added value to the financial institutes. These applications could include reporting, statistics tools and applications, e-learning applications designed to improve the performance quality of the financial institute's representatives, and the like. The business layer 98 is designed to provide high-level analysis of the integrated transactional interaction metadata, for the identification of trends and for formulating business intelligence information. Through the utilization of the business layer 98 managers, compliance officers and auditors can receive insight regarding improvements in service, successful and unsuccessful financial products, market trends, detection of proper and improper conduct, inspection and promotion, regulation compliance assessment, drill down analysis, business performance information and the like.

Figure 4:
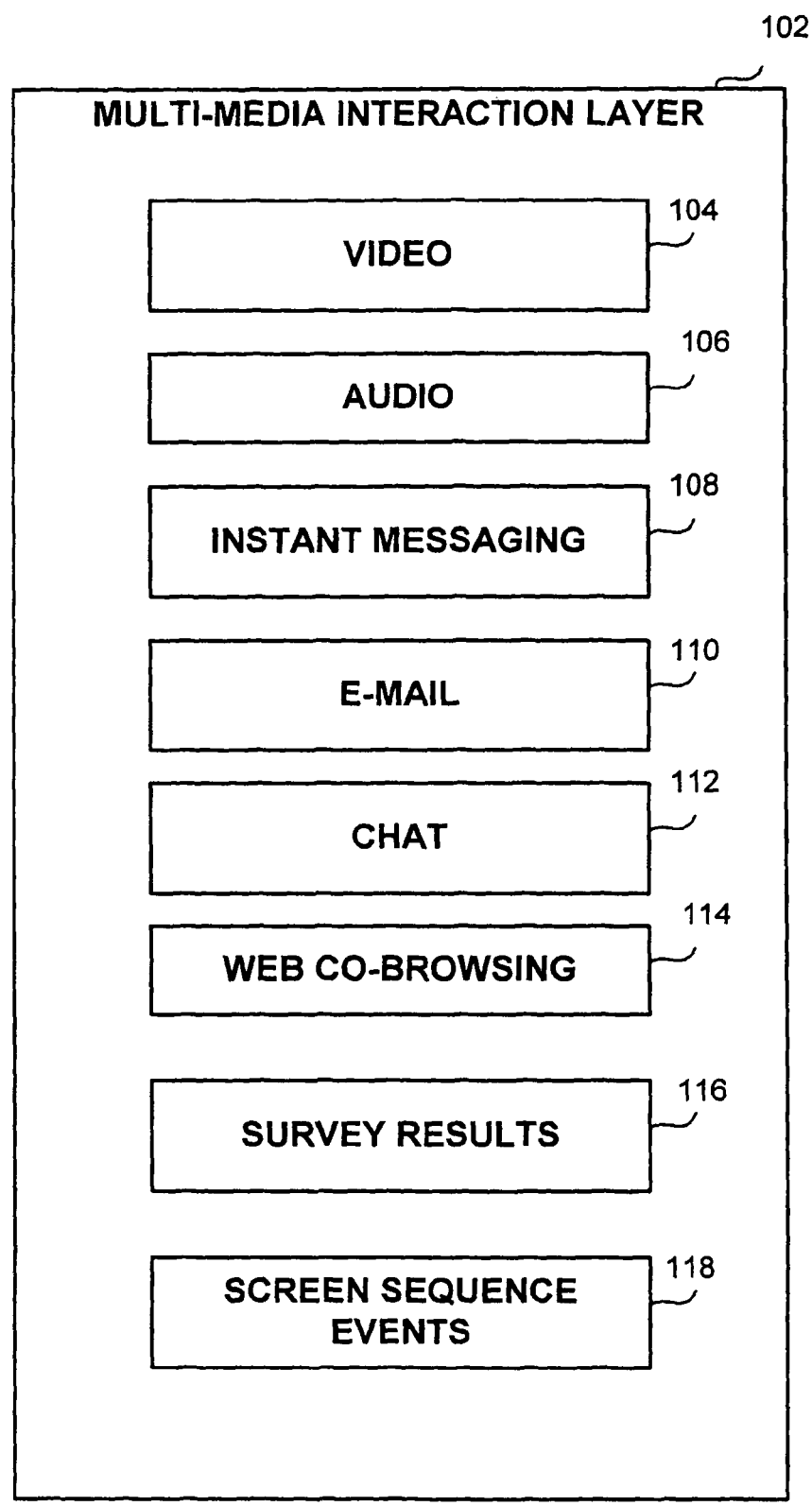
FIG. 4 is a schematic block diagram of the components constituting the multimedia interaction capture layer, in accordance with a preferred embodiment of the present invention.

Referring now to FIG. 4 showing a schematic block diagram of the components constituting the multimedia interaction capture layer. The multi-media interactions layer includes non-limiting examples of various interaction types that commonly present in financial institutes. The various interaction types were discussed herein above and could include media types, such as instant messaging 108, e-mail 110, chat 112, web co-browsing 114, survey results 116, which for example might proceed a phone call, screen sequence events 118 captured from within the desktop or other devices of a participant of the interaction, video images 104, and audio information 106 such as Voice over IP (VoIP), and the like.

Figure 5A:
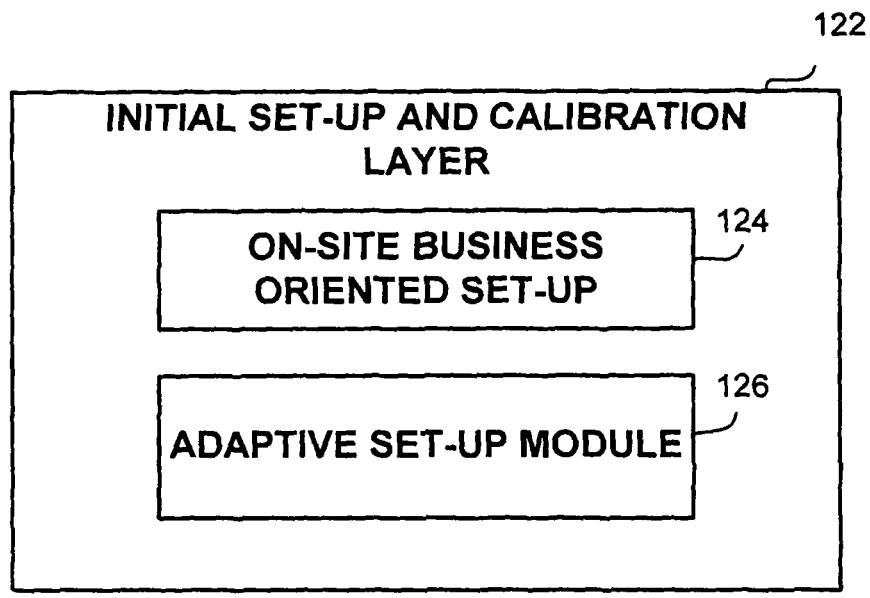
FIG. 5A is a schematic illustration of the initial set-up and calibration layer, in accordance with another preferred embodiment of the present invention.

Referring now to FIG. 5A the set-up and calibration layer 122 includes an on-site business oriented set-up module 124 and an adaptive set-up module 126. The on-site business oriented set-up module 124 provides for setting up the system in accordance with the needs of the financial institution as mandated by the operator of the system. One example demonstrating the functionality of the set-up module 124 concerns generating and setting certain parameters of a word-spotting engine. In trading floors a set of common words, such as "buy", "shares", "call option", "trader" and the like, would be introduced during a setup in order to enhance the results of a word spotting engine. Similarly words such as "gift", "bet", "alcohol" and other like words may be screened for. Another example of set-up information relates to the conflict of interest that arises if traders are permitted to deal for themselves in those commodities, instruments or products related to the ones in which they deal for their institution. In case dealing for personal account is permitted management should be able control and monitor and detect abuse cases such as "front-running", where an employee could execute a personal trade in advance of a client's or institutional order to benefit from an anticipated movement in the market. The trader's screen activity 118 of FIG. 4 in conjunction with the order for execution of the trade, are captured such that behavior of the employee is verified along the sequence of execution. The system will alert the management using an alert module (not shown) when an indication of suspected irregularity or possible malpractice is identified. In addition, during the lifetime of the system, the calibration and the set-up could be performed adaptively via the utilization of the adaptive set-up module 126 in accordance with profile and requirements of the institution and dynamically accumulated changes.

Figure 5B:
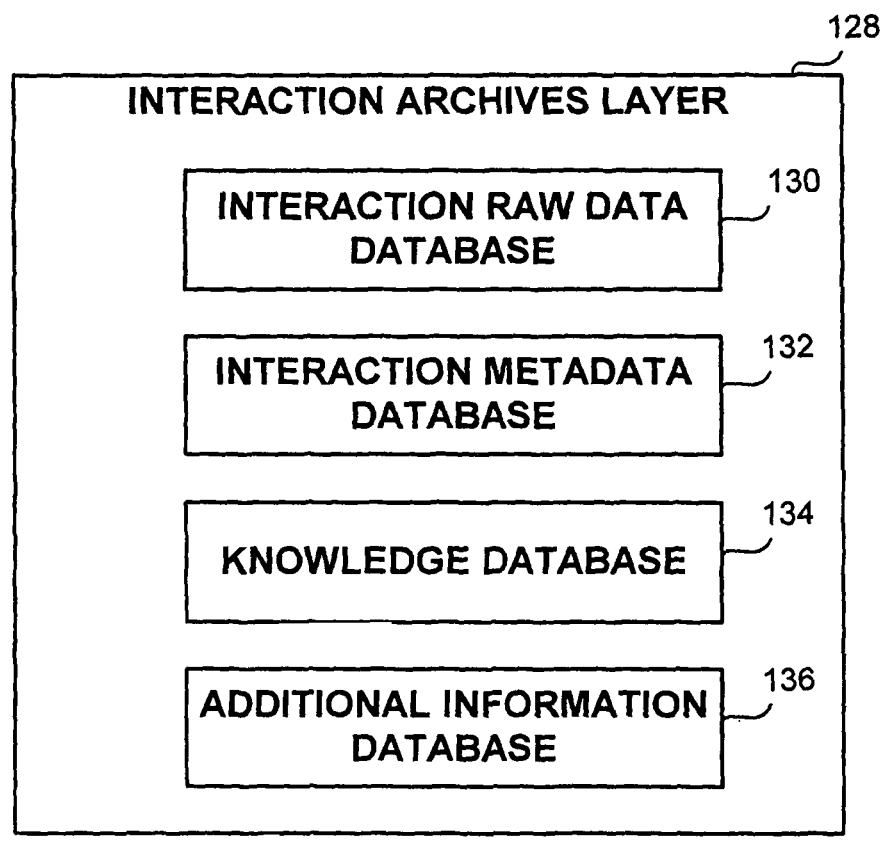
FIG. 5B is a schematic illustration of the interaction archiving layer, in accordance with another preferred embodiment of the present invention.

Referring to FIG. 5B the interaction archives layer 128 includes an interaction raw data database 130, an interaction metadata database 132, a knowledge database 134, and additional organization databases 136, such as CRM DB, ERP DB, Knowledge Base, and the like. The interaction raw data database 130 contains the actual interaction contents recorded and retained. The interaction metadata database 132 contains parameters and attributes associated with the raw data included in the interaction. Non-limiting examples include CTI information, retention and migration parameters, and the like. For example, the retention parameters concern the length of the period during which the call will be retained in the raw data base 130, such as long term retention or short term retention, before it will be erased and becomes non retrievable. The database 132 further contains migration parameters that define the destination media storage, such as DVD, DAT, Jukebox, Storage Area Network (SAN), designated file server, and the like, to which the interaction will be routed, stored into, and maintained on.

Figure 6:
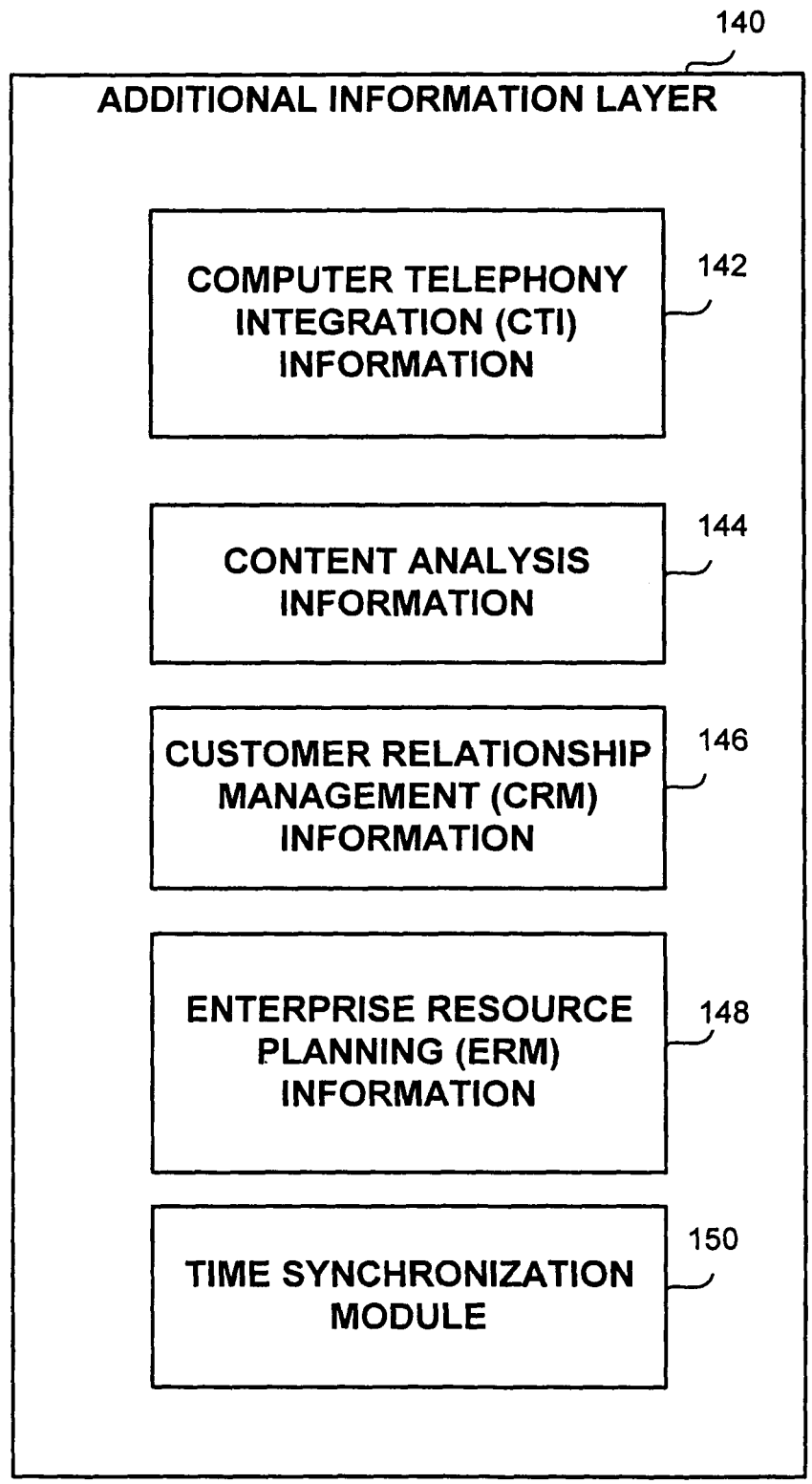
FIG. 6 is a schematic illustration of the additional information capture layer, in accordance with a further preferred embodiment of the present invention.

Referring now to FIG. 6 the additional data sources of the additional information layer 140 are being used with the interaction archives information for the purpose of collecting real-time information on the content of the interactions in order to monitor the code of conduct. Call information is received either from the Automatic Call Distributor (ACD) or from the ACD through the CTI. Call information coming from the ACD can be used in monitoring trader activity in real-time during the engagement of the trader in an interaction with a customer. Call information can also arrive from a Turret system, also known as a Dealer Board or from a Private Branch Exchange (PBX) system. CTI information 142 is of import since it is substantially accurate and could provide information about the length of the call, the calling number and the called number and extension through the Dial Number Identification Service, the agent, and customer IDs, the customer classification, and the like. Once the system has received CTI information 142 it is provided with a better capability both to pre-process interactions and later performing rule-based analysis 144 leading to enhanced results. CTI information 142 is utilized in conjunction with other transactional information, such as CRM data 146 and Enterprise Resource Planning (ERP) data 148, as additional inputs to be available by the application layer and during off-line business analysis. Content analysis information 144 was described in detail in the referenced co-pending PCT patent application number PCT/IL02/00593 titled Method, Apparatus and System for Capturing and Analyzing Interaction Based Content, filed 18 Jul. 2002. The time synchronization module 150 is designed to assist in the monitoring of the correct temporal sequence of events that occurred during the complete interaction in order to assure correct scenario reconstruction of events, for example for dispute resolution purposes. These purposes are achieved by synchronizing the timing devices of the servers and devices that handle interaction and transactional information. In order to identify money laundering and terror funding issues the additional information layer 140 provides solution for customer identification and verification. Customer identification could be achieved through various algorithms that the layer 140 could incorporate. One such algorithm for customer identification, for example, could be the Comverse PerSay solution. An alternative solution for customer identification that could be incorporated in the layer 140 is described in the related US patent application serial No. 2002/0110264B1 titled VIDEO AND AUDIO CONTENT ANALYSIS SYSTEM 15 filed August 2002.

Figure 7A:
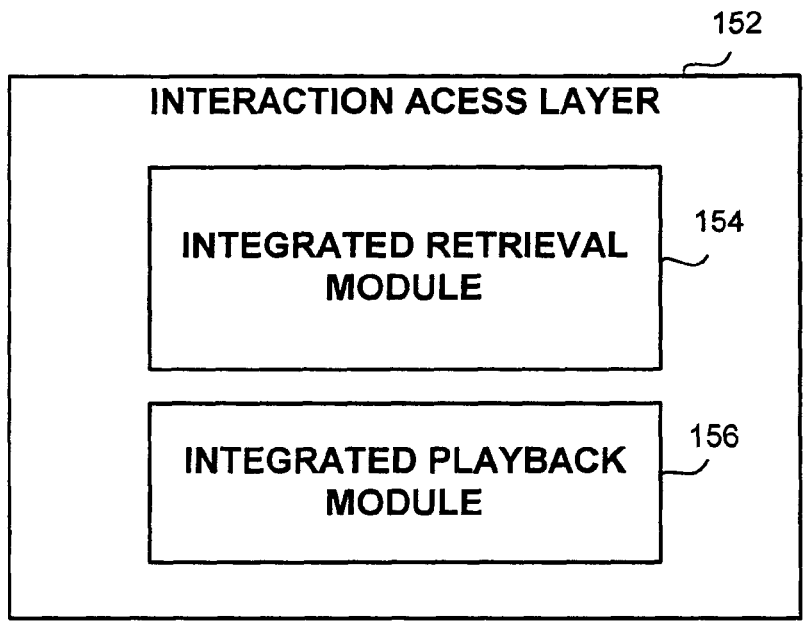
FIG. 7A is a schematic illustration of the interaction access layer, in accordance with a preferred embodiment of the present invention.

Referring now to FIG. 7A the interaction access layer 152 locates and retrieves interactions by using the metadata information 132 of the interactions archives layer 84, in conjunction with the additional information sources from the additional information layer 140. Requests for interaction retrieval from the application layer 96 or from the financial information systems layer 94 are sent to the integrated retrieval module 154 and the integrated playback module 156. The module 154 retrieves the required interactions and allows the reconstruction of events and interactions that constitute the complete transaction flow. The innovative part of this module is the integrated approach for presenting a single view of all types of interactions reconstructed in a synchronized order with accordance to the original generation of the interaction records.

Figure 7B:
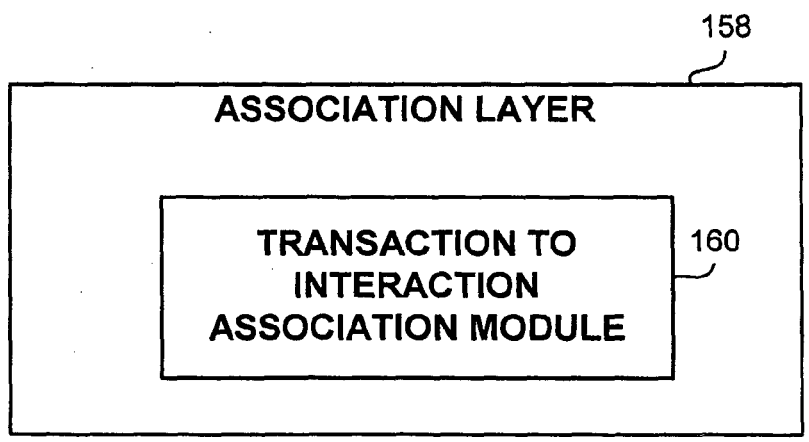
FIG. 7B is a schematic illustration of the association layer, in accordance with a preferred embodiment of the present invention.

Referring now to FIG. 7B the association layer 158 includes the transaction to interaction association module 160. The association layer 158 is responsible for associating a transaction in the financial institute's transaction system with the transaction-specific set of interactions that led to the transaction. The transaction-specific set of interactions is stored in the interaction archives of the interaction archives layer. The association of the transaction with the relevant set of transactions is accomplished by the utilization of an integration component. The innovation in the transaction to interaction association module 160 is evident from the manner the module 160 uniquely identifies each transaction and by using the integration component enable to link the set of interactions with relevant transactional data in the transaction system. The integration component and the transaction system will be described in more detail herein under in association with the following drawings.

Figure 7C:
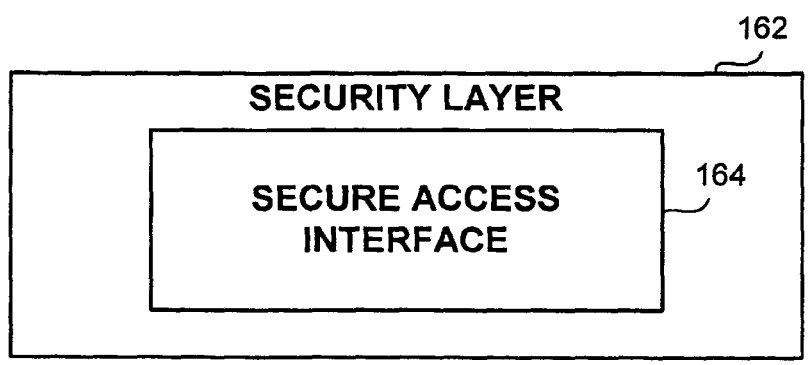
FIG. 7C is a schematic illustration of the security layer, in accordance with a preferred embodiment of the present invention.

Referring now to FIG. 7C the security layer 162 is responsible for complying with the code of conduct of financial institutes, which demands that access for the playback and the retrieval of interactions from the interaction archives will be managed in a secure, controllable and restricted manner. The secure access interface 164 is responsible for granting access to authorized personnel upon request. The interface 164 could be schedule-based via the utilization of an interaction-based security mechanism, which can be set up with or without time limitations.

Figure 8A:
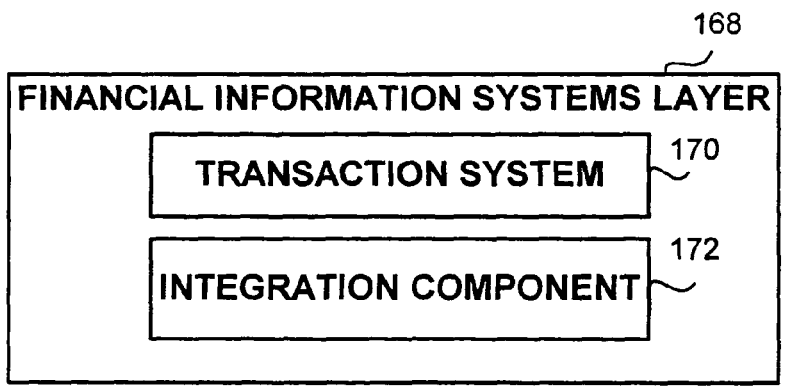
FIG. 8A is a schematic illustration of the financial information layer, in accordance with a preferred embodiment of the present invention.

FIG. 8A describes the financial information systems layer 168. The layer 168 includes the financial institute's transaction system 170. The system 170 includes the financial transactions generated following one or more associated interactions. The system 170 is the central system associated with the institution. The system 170 is utilized for the entering of activity information by a trader. Such information could include instructions provided to the trader from a client, where each instruction could include transactional amount, name of the participants in the transaction, beneficiaries, transaction type, and the like. One example of such a system is the Siebel CRM system designed and developed for financial institutions. The layer 168 further includes the integration component 172. The component 172 is responsible for associating a transaction stored in the transaction system 170 with a set of one or more interactions that led up to the generation of the transaction. The component 172 in conjunction with the transaction to interaction association module 160 of FIG. 7B links the relevant set of interactions with the suitable transactional data in the transaction system 170. The integration component 172 can be activated from within the financial institute's transactional system 170 providing a transparent retrieval and playback capability. The integration component 172 could be an ActiveX software component embedded as part of the transactional system 170 and displayed as an icon on the graphical user interface of a computing device operated by a representative of the financial institution in order to provide instant playback of the complete transaction-specific set of interactions. The integration component 172 is substantially similar to the "Nice Link" product of Nice Systems Ltd certified for integration with Siebel CRM system.

Figure 8B:
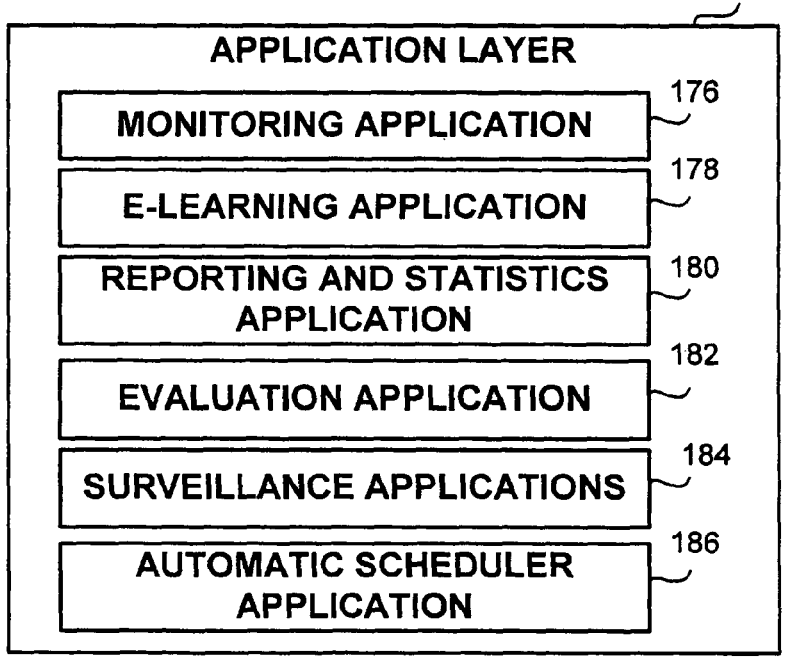
FIG. 8B is a schematic illustration of the application layer, in accordance with a preferred embodiment of the present invention.
Figure 8C:
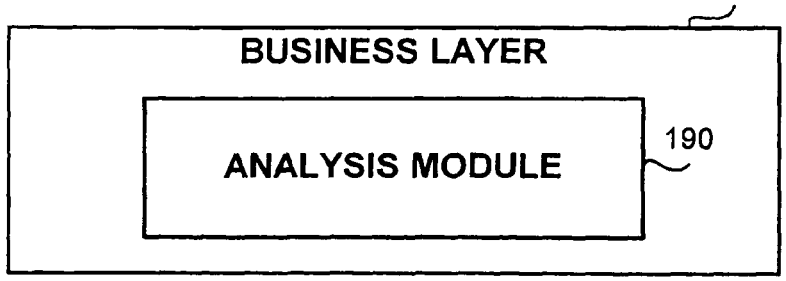
FIG. 8C is a schematic illustration of the business layer, in accordance with a preferred embodiment of the present invention.

Referring now to FIG. 8B the application layer 174 includes a monitoring application 176, an e-learning application 178, a reporting and statistics application 180, an evaluation application 182, a surveillance application 184, and an automatic scheduler 186. The functionality of the application layer 174 is the provision of diverse value-added applications to the financial institutions. The applications 176, 178, 180, 182, 184, 186 are designed to monitor conduct, to provide business performance information and to improve the performance quality of the financial institute's representatives. Monitoring application 176 allows key personnel of the financial institution, such as compliance officers, management, auditors, and supervisors to monitor selectively one or more interactions in real time. Evaluations application 182 allow managers of the financial institution to evaluate and assess the performance of the financial institute's representatives providing scores and deducing the skill of a representative using information collected in the additional information layer 86 and the interaction archives layer 84. The application 182 plays back the multimedia interactions within the multi-media interactions layer 81 with the additional information from the additional information layer 86 in order to improve quality and performance and to monitor that the behavior of the representatives is in compliance with the code of conduct or other rules. The automatic scheduler application 186 provides an automated selection of interactions generated and collected by the system for off-line evaluations in accordance with predefined rules. Through the use of the scheduler application 186, a program can be scheduled to prepare, in a randomized manner, for example, thirty calls from the last twenty-four hours for a specific compliance officer in order to provide the option to review the interactions through playing back and evaluating the content of the calls. Surveillance application 184 allow compliance groups and managers to implement a more detailed surveillance on specific representatives, specific customers or third parties for the purpose of identifying any suspicious behavior or interaction which may stand in contradiction to the required code of conduct. For example, the management should control, monitor and detect cases such as "front running", where an agent could execute a personal trade in advance of a client's order or an institutional order, to benefit from an anticipated movement in the market. The surveillance application 184 is further capable of setting a real-time alarm and/or generate and transmit a notification message where the system detects situations of misconduct. Such alarms or notifications provide the option for real time intervention during the performance of the interactions. The application 184 further provides an alarm indication or a notification to a compliance officer in cases where a dispute remains open or unresolved for a predefined period of time. A specific period of time could be defined during the activation of the system set up via the setup layer 82 or could be defined subsequently (preferably by a compliance officer) in order to handle a particular case. Referring now to FIG. 8C the business layer 188 is designed to provide high level analysis of the integrated transactional interaction metadata, for the identification of trends and for formulating business intelligence information. Through the utilization of the business layer 188 managers, compliance officers and auditors can receive insight regarding improvements in service, successful and unsuccessful financial products, market trends, detection of proper and improper conduct, inspection and promotion, regulation compliance assessment, drill down analysis, business performance and the like Analysis results are stored in the organization's knowledge base database 134 in the interaction archives layer 128 of FIG. 5B. The stored results can further be used for adaptive purposes such as modeling and identifying changes in behavior, and feed the results back into the system. The feedback can be used to place automatically suspected parties such as traders or even the compliance officers themselves under system surveillance due to suspicious indicators previously detected. A non-limiting example concerns a senior trader that just started to use drugs where the organization is an aware of this harmful situation. The trader was previously known to the organization as a highly competent, skilled, and hard worker who adequately follows regulations of the organization. His personal revenues, dealing with the organization commodities, gained constant growth in past 12 months. The system stores the profile of the trader and records all the transactional achievements and the interactions handled. At some point in time several changes are identified in the behavior of the trader. The system detects monitors and records the changes by utilizing information from the additional information layer 140 of FIG. 6. The content analysis engines detect high tones and aggravated behavioral stress during several interactions. The number of cross talk phenomena dramatically increases. The trader submits repeated requests for playback of the same interaction and his captured screen events indicate an increased number of backspace keystrokes and multiple deletions during the interaction sessions. These suspicious behavioral patterns are not in accordance with the trader's past profile. Therefore, the system marks the trader for surveillance. In extreme situation were considerable amounts of money are involved and a suspicious behavioral pattern is detected, a real time alarm is triggered and/or a notification routine is activated in order to transmit a suitable message calling for supervisor intervention. The supervisor then will act in the appropriate manner to prevent the trader for exposing the organization to risk.

The code of conduct in financial institutions requires that there will be a complete view of all the customer's interactions with the financial institution. One of the problems that need to be resolved is that a third party can interact with the financial institute using, for example, an email address "A", using an Instant Messaging account "B", dial-in from a phone number "C", and the like. The financial institute's representative can also use different identifiers during interactions, such as e-mail address, IM account number, phone extension number, and the like. Another integration obstacle is the time synchronization between the transactional and the logging systems. The code of conduct requires that all the interactions will be displayed in the temporal sequence in which they occurred, since an instruction given in later interaction should override any instruction given in previous interactions.

Figure 9:
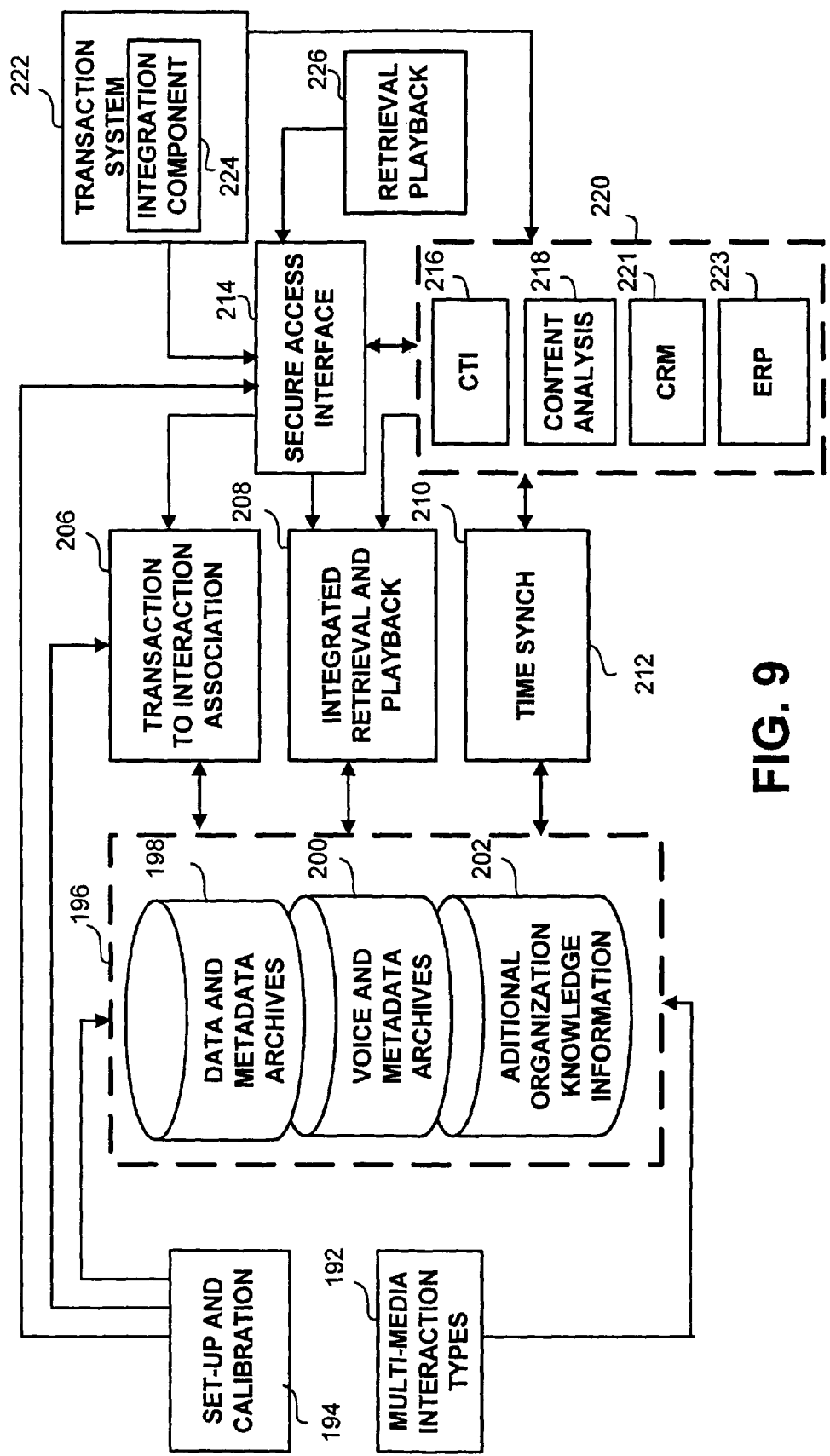
FIG. 9 is a schematic block diagram describing the operative components of the proposed system, in accordance with a preferred embodiment of the present invention.

Referring now to FIG. 9 showing a schematic block diagram describing the components of the system, in accordance with a preferred embodiment of the present invention. Requests for interaction retrieval and playback can originate from either the application layer (not shown), from the integrated retrieval and playback 208 or preferably directly from the transaction system 222. The requests could include submitting a request for playback, submitting a query on certain interactions, and the like. The ability to embedded query, retrieval and playback capabilities (that inherently belongs to the logging system) into a different system such as the transaction system 222 is done by using the integration component 224. The component 224 is operative in the linking of the transaction system with the interaction archiving systems. The link could be accomplished via the utilization of ActiveX components that maintain a reference pointer to the interactions tables located in the archives 196 associating the interaction type record metadata with the transactional information in the transaction system 222. The request is then sent to the integrated retrieval/playback module 208, which is used to provide an integrated view of all the interactions captured in the financial institute. The integrated retrieval/playback module 208 is capable of locating all multimedia interactions that constitute the single transaction required to be retrieved. The integrated retrieval and playback component 208 uses the sources in the additional information sources 220, such as the real-time CTI information 216, the content analysis results 218, and the collected meta-data 198, 200 of the interactions archives 196 in conjunction with other organizational information, such as profile, account numbers, social security number and the like, in order to make the association of all the different identifiers, such as e-mail account, instant messaging user id, phone extension number, account number, customer number, and the like. If, for example, there is a need to track a certain deal or sale that was made by a specific financial institute's representative, then the integrated retrieval and playback module 208 will be used. The module 208 will communicate with the meta-data database 198, 200, CRM information 221, ERP information 223, content analysis information 218, and CTI information 216 in order to identify correctly and track suitably the data and voice interactions which were made by the representative of the financial institution in accordance with diverse assigned identities supporting any of the multimedia type of interactions.

The second function of the integrated retrieval/playback module 208 concerns the reconstruction of the original temporal sequence in which the interactions occurred. The time synchronization module 212 is used for synchronizing the timing devices of the modules and devices that handled the transaction-specific interactions alongside other sources of information systems, such as CRM system server, ERP system server, Content Analysis Server, CTI server, and the like. The module 212 constantly monitors and verifies that all the severs that communicate across the system are time synchronized, even if they are located remotely in respect to each other, since the timestamp generated by the timing devices should reflect the precise point in time associated with the occurrence of the interactions. An exemplary protocol for suitably synchronizing devices is the Network Time Protocol (NTP). Synchronization is used in order to reconstruct the correct temporal sequence of the interactions. The time synchronization of the timing devices of the interaction archives guarantees that the correct sequence of events is maintained, so the integrated retrieval/playback module 208 associates the transaction-specific set of interactions in accordance with to the timestamp generated at that point in time in which the interactions were captured. Transactions often require special investigation, either due to a dispute with a customer or due to a request from an auditing body. The investigation will include the examination of the interactions that led to this interaction. For example, if a customer complains that an order he gave in a phone call was not executed correctly, the financial institute will search for the audio of the call and will playback the audio to determine whether the customer was right or wrong. If an auditor would like to further investigate a suspicious looking transaction, so the financial institute will need to search for the interactions that led to this transaction to see the all picture. A suitable match between the actual transactions record to one or more interactions that led to that transaction in dispute is needed. The assumption behind this association and/or matching solution is that an interaction will always precede the transaction so a matching of a transaction to the interactions will be performed for each transaction as it is entered into the transaction system. A unique identifier will be created for each interaction and the identifier will then be entered into the transaction system alongside the details of the transaction.

Still referring to FIG. 9 the process begins with the assignment of a unique identifier to each of the multi-media interactions 192. The interaction identifier could be created by the capture unit of the interaction (not shown), such as the telephone switch in case of a telephone call, an exchange server in case of e-mail, or the voice and data metadata servers of the interaction archives layer. For example, an SQL database server could create the identifier and store it with as part of the metadata. The transaction to interaction association module 206 will receive the identities of the interactions in real time during the occurrence of the interaction. The module 206 will continue the matching process by presenting the interaction identifiers to the financial institute's representatives where each representative will be presented with the identifiers of his own interactions. The identifiers are presented to the representative by the utilization of the integration component 224. The component 224 runs on the computers of each representative either as a taskbar or as a background application. The representative submits the interaction identifiers to the component 224 which in turn will display the identification of the last interaction made by the representative. The application will also show the most recent identifiers along with details describing the interactions such as interaction id, time of interaction, media type, such as phone, email, instant message, and the like, third party identity and other such information.

Once an interaction has ended in a transaction, the representatives enter the details of the transaction into the financial institute's transaction system 222. To make the link between the transaction and the interactions that led to that transaction, the representatives would now need to manually enter the interaction identifier, which is displayed by the integration component 224, into the transaction system 222. Currently, records of the transaction are recorded manually by the trader. First, typically a paper document, such as a pre-defined form, is utilized by the trader in order to record the details of the transaction. Next, the trader will manually copy the details of the transaction from the document into the transaction system 222. Presently, the details do not include the interaction type or the interaction content that lead to the transaction.

In the preferred embodiment of the present invention the integration component 224 collects the interaction identifiers of each interaction type associated with each of the parties involved, such as beneficiaries, trader, name of institutions involved in the transaction and the like. The integration components further collects the performed transactions. The integration component 224 stores the collected information. The collected information could be retrieved, displayed via the transaction system 222 or via a separate component designed to display the information in a suitable manner. The integration component is linked to the other components of the system of the present invention and could, for example, provide a notification if there is a discrepancy between the actions of the trader vis-a-vis the transaction system 222 and the interactions captured. An exemplary situation involving a discrepancy could arise where a transaction is identified through the analysis of the interaction using the content analysis engine although the trader failed to record the transaction, or failed to enter specific details, or entered the inaccurate details of the transaction into the transaction system 222. This will allow providing proper notifications at the time transactions are entered into the transaction system 222. Preferably an automatic process will be implemented where the integration component 224 will interact with the screen sequence events capturing mechanism 118 of FIG. 4. Screen events capturing was described in detail in the referenced co-pending US published patent application number PCT/IL01/00796 titled SYSTEM AND METHOD FOR CAPTURING BROWSER SESION AND USER ACTION filed 24 Aug. 2001. In particular, screen events relate to the actions of the user during an interactive session over a network. Screen event capturing features a client which is operated by the computational device of the user, and which more preferably collects information both about user input device actions and the reactions which are displayed through the user interface. Consequent to the entering of the transaction identifier into the suitable data field in the transactional system 222 all identifiers of the transaction-specific interaction types are associated via triggered association ("on-the-fly") by the transaction to interaction association module 206. Through the set-up and calibration 194 the tuning of the system during setup can reflect the number of multimedia interactions and the buffer size that will hold the interaction identifiers, needed for the association process. The integration component 224 will examine the screen sequence of events. When a representative of the financial institution begins the process of entering a transaction into the transaction system 222 the integration component 224 will be triggered to interact with the transaction system 222 in order to place automatically the interaction identifiers in the desired data fields either a specific transaction entry form or the screen. The identifiers are associated at database level 196 via the utilization of the transaction to interaction association module 206, for future retrieval of complete transaction-specific interactions.

The financial institution archives, such as the interaction types databases, the transactional database or any additional information system, contain private and sensitive information. The code of conduct for financial institutes requires that access to such data should be limited and restricted especially in the case of the interaction archives. The requirement for managing and controlled access is typically characterizes financial organizations where access needed to be dynamically granted on a daily, per case basis, and where the organization is constantly being monitored by representatives assigned by the institution's management, SEC, FSA, NASD or the like in order to detect misconduct. The proposed apparatus, system and method enables allow compliance officers or other authorized personnel to grant access to a representative requesting to retrieve and playback a specific interaction. The representative will not be able to access any interactions other than those that were specifically granted to him, nor will he be able to make any modifications to the original interaction, such as the raw data, and to the metadata. The secured access 214 guarantees data integrity that no one can interfere with the interaction types stored thereby assuring that the transaction-specific interactions are kept secured, intact and are admissible in court.

In addition, the interaction identifiers will be logged and linked with the record that describes the set of interactions. The interactions record could hold CTI real time parameters, such as caller ID, e-mail address, content analysis customer identification, and other identifiers, such as ANI number and DNIS number. Thus, during an interaction while entering the details of the transaction, the trader participating in the interaction could retrieve and playback the entire set of interactions since the interaction identifiers are linked together at database level. After the termination of the phone call the trader receives an e-mail from the same customer. The e-mail address of the customer is captured by the screen event and received by the software driver connected to the e-mail server. Since the same customer is involved with the same trader the phone call and the e-mail are linked and associated at the database level to the same transaction. When the trader enters the transaction information into the transaction system the system automatically associates the transaction with the set of interactions.

Still referring to FIG. 9 the secure access interface 214 will be the access permission gateway for all the above described applications 176, 178, 180, 182, 184, 186 of the application layer 174 of FIG. 8B. All the applications that requires querying, locating, retrieving or playback one or more transaction-specific interactions required to obtain secure access interface 214 authorization. A trader, via for example the transaction system 222, submits a request for retrieval of one or more interactions previously performed. The trader desires to verify that he had followed the entire customer request and the purchasing of the right amount of shares was done in the proper manner. The security access interface 214 will decide whether this request should be granted or rejected based on that particular trader profile set through the set-up and calibration 194 by the system administrator. As all the organization members' profiles, privileges, such as read, write, update delete, retention setting, and the like, access rights are kept and managed by an administrative database authorized administrators can set rules that resides in the secure access interface 214. These rules can be retrieved or accessed from the organization database upon request. When such a request is submitted the system automatically approves or rejects the request and display a suitable message with an attached short explanation. System administrators can be compliance officers or any other authorized personnel responsible for controlling the access to the archives. The administrator will also have an application interface (not shown) to the secure access interface 214 in order to approve or eject the requests for retrieval/playback. The secure access interface 214 then generates a password, which will grant access only to the requested interactions. As the password is currently entered via the phone keyboard it is convenient to use a numeric password. The numeric password could be generated in a random manner or could be based on the Personal Identification Number (PIN) of the requestor. The system could be set-up 194 to use generated random or PIN-based passwords, which are only valid for a time-limited period, such as a week, for example. Upon receiving the password, the requestor will be able to use the password passed to the integrated retrieval/playback 208 and to access required interactions in the archives 196. The system can be set-up in such a manner as to provide further protection of the archives and for the prevention of direct access of the application to the archives by making a copy of the interactions stored in the archives 196 to the integrated retrieval/playback 208. This will ensure that even if the user will somehow override the system and find a way to bypass the secure access interface 214 and "manipulate" the interactions, it will not affect the original copy of the interaction, which stays intact and untouched in the genuine archives.

There are two different ways for using this password protected interaction access. The first is better suited for data access and the later for voice access. Using the first method the requestor uses a computer-based application that accesses the secure access interface 214. The requestor then is enabled to view all the requests he made and their status, and can see which requests have been approved. By selecting the request he wants to pursue he is then prompted to enter the access password. After validating that the password is correct and valid, the secure access interface 214 will command the integrated retrieval/playback 208 to transfer a copy of these interactions to the requestor's screen. Using the second method, in case audio interactions, it will be more convenient for the requestor to use his telephone handset for listening to a specific interaction. The secure access interface 214 will support a dial-in based accessed using, for example, an IVR server (not shown). The requester will be prompted by the system to enter his password, which could be entered by using the telephone digits or keys (0-9, *, #) and key in the password granted to him. If the password is correct and valid the system will access the integrated retrieval/playback 208 and play the voice interactions to the requestor by phone. For transferring over the phone all types of voice interactions such as phone calls, Voice over IP, voice instant messages, and the like, the system can utilize prior art solutions such as "Executive (remote) connect" product of Nice System Ltd where remote access via Dual Tone Multi Frequency (DTMF) to a designated extension in a telephony switch, provides monitoring and playback of interactions captured by the logging system. In addition to voice interactions over the phone, it is also possible to translate other data interactions such as e-mails, instant messages, and the like, to voice, which will be transmitted over the phone. The system could use text-to-speech solutions in order to convert the text into voice and to "read" the text to the requester. The benefits of the executive connect second method is that it allows accessing the system even at times which the requestor is outside the office and only can access the organization by telephone.

An important part of the work of compliance officers, auditors and managers in a financial institute is to sample the interactions of the representative with customers or with other interested parties in order to verify that the code of conduct is followed. By reviewing a representative sample of the interactions these persons, usually assign by the financial institution management, might locate, and identify cases of misconduct.

The proposed apparatus, system and method further provide an automatic scheduler application 186 of FIG. 8B. The application 186 is configured according to a pre-defined setup performed via the on-site business oriented set-up 124 of FIG. 5A that allows the business to determine which key personnel will be authorized to review the one or more transaction-specific interactions, the number of interactions to be reviewed during a specific period, such as during a week, a month, and the like. The setup 124 further allows the business to determine the business filtrating rules operative in deciding which interactions are more "interesting" for review. The automatic scheduler 186 will communicate with the voice archives, data archives, metadata archives, additional archives, and with the sources of the additional information layer 140 of FIG. 6, such as CTI information 142, CRM information 146, ERP information 148, and the like, in order to determine which interactions should be reviewed according to the business needs. More specifically, a scheduling program could be set up via the automatic scheduler application 186, or the system could automatically prepare according to the initial setup and calibration business rules and action setting, directed according to the organization's preferences and/or business preferences. For example, a first program could be set to record 5% of the calls performed in the next 24 hours while a second program could be set randomly to record 10 interactions involving e-mail and Voice over IP (VoIP) interactions scheduled for a specific time interval. Following the location of the specific interactions, the interactions are made available to the reviewers through the use the evaluations application 182 of the application layer of FIG. 8B. The automatic scheduler 186 will also alert the reviewers, either by e-mail, Short Message Service (SMS), Instant Messaging (IM), and the like, that there are interactions waiting for review. Using the evaluations application 182 the interaction samples are played back and reviewed and the reviewers enter the results into evaluation forms in a pre-defined manner. Subsequently, the evaluations are stored in the organization's database (not shown) and are available for access by the business analysis module 190 of the business layer 188 of FIG. 8C for the purpose of collecting business intelligence. The module 190 could detect, for example, fraudulent behavior, dealings in personal accounts, "front running", untruthful dealing with the organization's commodities, accepting gifts that may effect integrity and any unfamiliar or unusual behavioral pattern that may indicate that a conflict of interest influenced the judgment of the trader, and the like.

There are situations where a trader fails (either unintentionally due to excessive work load or stress or intentionally for the purposes of "front running") to enter the transaction details into the transaction system. Such an event is considered illegal and financially harmful to the organization since the situation of "long position" vs. "short position" (e.g. extra cash vs. shortage of cash, respectively) provides an distorted picture of the events. The proposed apparatus, system and method includes a content analysis component that is operative in the real-time spotting of words and/or sentences. The identification or detection of sentences such as "buy XXXXXX K$", or such as "order for me XXXX shares", and the lack of entering of transactional information detected by screen events that capture screen events on the transactional system analyzed by the system, will send suitable notification to a supervising individual, such as a Chief Trader, in order to provide the option of following up on the specific interaction and in order to assure that the transaction is entered properly into the transaction system. Optionally, a threshold value can be set during set-up to indicate the amount above which the alarm will be triggered or the notification will be produced in an automatic manner. After the proposed apparatus will prove to be fully reliable it could be modified such as to provide the option of feeding directly and automatically the transaction system without depending on the recall capability or the willingness of the trader.

The sequence of the transaction entered into the transaction system could indicate misconduct, such as "front running" or "insider trading". The proposed apparatus uses screen event capturing verified against the actual timestamp of the interaction and the captured content. For example the fact that a first transaction occurred before a second transaction and the second transaction was entered into the transaction system before the first transaction may indicate a potential misconduct and therefore could trigger generate an alarm and/or generate and send a suitable notification to a supervising individual.

The proposed apparatus, system and method provides real-time detection of suspicious activities, unusual customer behavior patterns, and the like, based on content analysis, screen events and additional data gathering information. For example, a customer asking for the transfer of $1000 a thousand times can be tagged as suspicious. Similarly, the existence of two accounts with different customer names and different customer addresses but with the same telephone number could be also considered as suspicious and tagged accordingly. Note should be taken that in addition to the monitoring of individual customers monitoring of institutional customers, such as mutual funds, corporate accounts, and the like, is provided.

The monitoring and the reviewing of transaction-specific set of interactions makes available the option of providing quality management having full capabilities. Quality management is constantly implemented in a various market segments, such as for example, in Call Centers where service providers are evaluated for their quality of service and assigned e-learning sessions to promote their skills to the benefit of the organization. The proposed apparatus, system and method innovatively utilize the quality management applications in the financial institution to promote quality of service of traders, of brokers and the like.

It will be appreciated by persons skilled in the art that the present invention is not limited to what has been particularly shown and described hereinabove. Rather the scope of the present invention is defined only by the claims, which follow.

The invention claimed is:

1. An apparatus for detecting misconduct related to a transaction associated with an organization, the apparatus comprising one or more computers or processors for executing software components, the software components comprising:
   a capturing component for capturing an interaction containing audio, wherein the interaction constitutes communication with the organization;
   a transaction receiving component for receiving a transaction, wherein the transaction constitutes a financial deal with at least one financial institution separate from the organization and the interaction;
   an association component to associate the interaction with the transaction based on determining the interaction as previously leading to the transaction and further creating and setting, based on data provided by a party to the transaction, a unique identifier to the interaction in data of the transaction which is duplicated in data of the transaction, and linking data of the interaction with data of the transaction using the unique identifier that is consequently common to the interaction and the transaction;
   an at least one recording and logging component for storing the interaction, and the transaction in an organization database;
   a retrieval component for retrieving the interaction and the transaction from the organization database;
   an audio content analysis component for performing audio content analysis on the interaction and detecting a predetermined word or sentence mentioned in the interaction;
   a transaction analysis component for analyzing the transaction and detecting a suspicious transaction; and
   a business analysis component for identifying misconduct associated with the organization, based on the predetermined word or sentence and the suspicious transaction,
   wherein said capturing component is programmed to capture information from devices selected from the group consisting of: a telephone, a fax, an e-mail server, an analog video camera, a digital video camera, an analog audio microphone, and a digital audio microphone.

2. The apparatus of claim 1 further comprising a secure access component to provide for secure, controlled and limited access to the interaction and the transaction.

3. The apparatus of claim 2 wherein the secure access to the interaction is based on password-protected permission granting process, wherein the secure access is a password and time based access.

4. The apparatus for claim 1 further comprising:
a database for storing meta-data related to the interaction.

5. The apparatus of claim 1 further comprising a speech analysis component for detecting voice characteristics within the interaction.

6. The apparatus of claim 1 further comprising a notification message-generating component for generating a notification message associated with the interaction, the notification message is associated with misconduct, dispute resolution, or with a request for playback.

7. The apparatus of claim 1 further comprising:
a monitoring component to monitor in real-time the content of the interaction;
an evaluation component to evaluate the performance or level of service of a representative; and
a surveillance component to detect and monitor a behavior pattern of the representative.

8. The apparatus of claim 7 wherein the monitoring component, the surveillance component, and the business analysis component provide information in real time or off line.

9. The apparatus of claim 1 wherein the interaction is between at least two parties.

10. The apparatus of claim 1 further comprising an automatic scheduler component for the automatic selection of interactions to be monitored, analyzed and evaluated.

11. The apparatus of claim 1 wherein the interaction is an audio or video interaction.

12. The apparatus of claim 1 wherein the transaction is captured through capturing screen events occurring on a screen used by a trader.

13. The apparatus of claim 1 further comprising a time synchronizing component for synchronizing the interaction with a second interaction associated with the transaction.

14. The apparatus of claim 1 wherein the misconduct relates to fraudulent behavior.

15. A method for identifying code of conduct non-compliance related to a transaction associated with an organization, the method comprising:
capturing an interaction containing audio by an interaction capturing device via an audio communication interface apparatus employing a Computer Telephony Integration device and a recorder device, wherein the interaction constitutes communication with the organization;
capturing a transaction by a transaction device, wherein the transaction constitutes a financial deal with at least one financial institution separate from the organization and the interaction;
associating the interaction with the transaction by determining the interaction as previously leading to the transaction and further creating and setting, based on data provided by a party to the transaction, a unique identifier to the interaction in data of the transaction which is duplicated in data of the transaction, and linking data of the interaction with data of the transaction using the unique identifier that is consequently common to the interaction and the transaction;
performing audio content analysis on the interaction for detecting a predetermined word or sentence mentioned in the interaction;
analyzing the transaction for detecting a suspicious transaction; and
identifying misconduct associated with the organization, based on the predetermined word or sentence and the suspicious transaction.

16. The method of claim 15 further comprising the step of setting up the operating parameters of the method and adaptively calibrating the operative parameters.

17. The method of claim 15 wherein the step of analyzing the transaction and the interaction is associated with a dispute.

18. The method of claim 15 wherein the step of analyzing provides for regulatory compliance or for quality management.

19. The method of claim 15 further comprising:
the step of monitoring in real-time the content of the interaction for the detection of malpractice; and
the step of automatically scheduling and automatic selection of the interaction to be monitored, analyzed and evaluated.

20. The method of claim 15 wherein the interaction is identified by a unique point-in-time based interaction identifier.

21. The method of claim 15 wherein the wherein the transaction is captured through screen events occurring on a screen used by a trader.

22. The method of claim 15 further comprising:
capturing a second interaction associated with the transaction; and
time-synchronizing the interaction with the second interaction.

23. The method of claim 15 wherein the misconduct relates to fraudulent behavior.

* * * * *